United States Patent
Miyahara

(10) Patent No.: US 10,126,695 B2
(45) Date of Patent: Nov. 13, 2018

(54) IMAGE FORMING APPARATUS THAT IS IMPROVED IN JAM PROCESSING EFFICIENCY

(71) Applicant: CANON KABUSHIKI KAISHA, Tokyo (JP)

(72) Inventor: Nobuaki Miyahara, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/668,020

(22) Filed: Aug. 3, 2017

(65) Prior Publication Data

US 2018/0059603 A1    Mar. 1, 2018

(30) Foreign Application Priority Data

Aug. 26, 2016 (JP) ................. 2016-165738

(51) Int. Cl.
  *G03G 15/00* (2006.01)
  *H04N 1/32* (2006.01)
  *H04N 1/00* (2006.01)

(52) U.S. Cl.
  CPC ....... *G03G 15/5087* (2013.01); *H04N 1/0005* (2013.01); *H04N 1/00029* (2013.01); *H04N 1/00076* (2013.01); *H04N 1/3263* (2013.01); *G03G 15/502* (2013.01); *H04N 1/00323* (2013.01)

(58) Field of Classification Search
  CPC .................. G03G 15/5087; H04N 1/00029
  See application file for complete search history.

(56) References Cited

U.S. PATENT DOCUMENTS

| | | | | | |
|---|---|---|---|---|---|
| 5,974,683 | A | * | 11/1999 | Shibata | B41F 33/0036 101/246 |
| 7,206,083 | B2 | * | 4/2007 | Shimada | G03G 15/655 358/1.12 |
| 7,441,773 | B2 | * | 10/2008 | Kasahara | B41J 11/006 271/279 |
| 8,662,618 | B2 | * | 3/2014 | Okamoto | B41J 11/006 347/101 |
| 8,860,989 | B2 | * | 10/2014 | Link | H04N 1/00716 271/8.1 |

(Continued)

FOREIGN PATENT DOCUMENTS

JP    2005001837 A    1/2005

*Primary Examiner* — Ibrahim Siddo
(74) *Attorney, Agent, or Firm* — Rossi, Kimms & McDowell LLP

(57) ABSTRACT

An image forming apparatus that facilitates user's determination of necessity of setting an inspection resuming page and is improved in jam processing efficiency. A sheet having an image formed thereon by an image forming unit is conveyed along a sheet conveying path. A sheet inspection device inspects the image on a sheet being conveyed through sheet conveying path. When a jam occurs in the conveying path, image formation by the image forming unit is interrupted. When jammed sheets are removed, formation of images including those formed on the jammed sheets is resumed. When a leading one of the jammed sheets is on a downstream side of the sheet inspection device, the image formation is resumed from an image formed on the leading jammed sheet, based on a user instruction.

12 Claims, 15 Drawing Sheets

(56) References Cited

U.S. PATENT DOCUMENTS

| | | | | |
|---|---|---|---|---|
| 8,988,718 B2* | 3/2015 | Maehira | ............... | G06F 3/121 358/1.13 |
| 2006/0126099 A1* | 6/2006 | Nakagawa | ........... | G06K 15/002 358/1.14 |

* cited by examiner

EXAMPLE OF READ SHEET IMAGE

EXAMPLE OF DATABASE

| RECORD NUMBER (321) | NAME (322) | AMOUNT (323) | ... |
|---|---|---|---|
| 00000001 | MARK SMITH | xxxxxxx | xxxxxxx |
| 00000002 | ○○ ○○ | xxxxxxx | xxxxxxx |
| 00000003 | □□ □□ | xxxxxxx | xxxxxxx |
| 00000004 | △△ △△ | xxxxxxx | xxxxxxx |
| ... | ... | ... | ... |

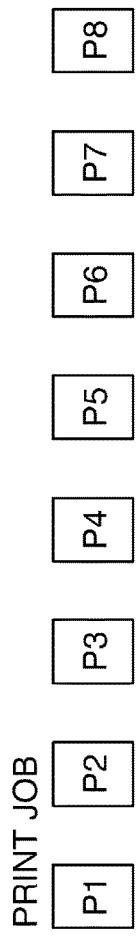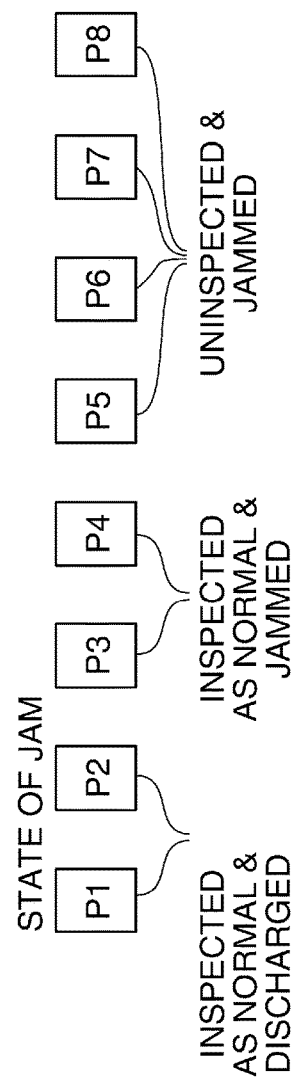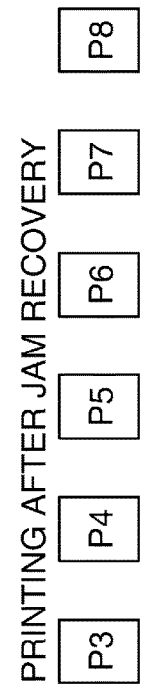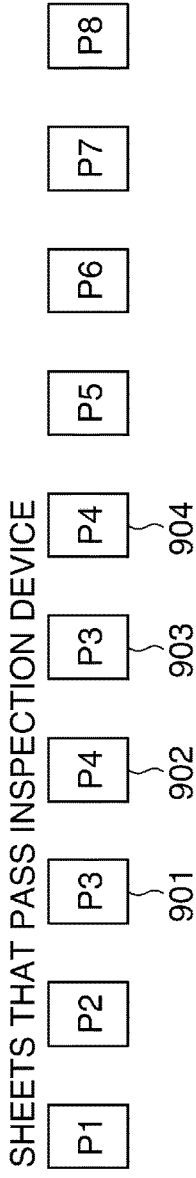

IMAGE FORMING APPARATUS THAT IS IMPROVED IN JAM PROCESSING EFFICIENCY

BACKGROUND OF THE INVENTION

Field of the Invention

The present invention relates to an image forming apparatus that is equipped with a sheet inspection device.

Description of the Related Art

In recent years, there has been known a printing system that inspects a sheet printed by a printing apparatus using a sheet inspection device while conveying the sheet. When inspecting a printed sheet, an image on the printed sheet which is being conveyed is read by the sheet inspection device, and the read image is analyzed to thereby determine whether or not the printed sheet is a normal sheet.

The sheet inspection device inspects a sheet, for missing of a bar code or ruled lines, image missing, defective printing, sheet duplication, sheet missing, color misregistration, and so forth. Then, if it is determined as a result of the inspection that a printed sheet is a defective sheet, printing is interrupted, and the defective sheet and sheets which have already been fed following the defective sheet are discharged to a discharge destination which is different from a discharge destination of normal sheets. This prevents the defective sheet from being mixed in the normal sheets. In a case where a defective sheet is detected, printing is resumed from a page corresponding to the defective sheet, by causing the printing apparatus to start jam recovery processing after the user makes a new setting of the sheet inspection device such that the inspection is executed again from the page corresponding to the defective sheet.

In a case where a sheet being conveyed is inspected by the sheet inspection device provided on a sheet conveying path for conveying sheets, there is a possibility that a jam occurs in the sheet conveying path at a location downstream of the sheet inspection device in a sheet conveying direction (hereinafter simply referred to as the "downstream side"). In this case, the jammed sheet is a sheet which is determined as a normal sheet by the sheet inspection device. An image printed on the jammed sheet is printed again after performing jam recovery processing, and hence inspection by the sheet inspection device is also performed again. Therefore, if jam recovery processing is performed without making any new setting of the sheet inspection device, depending on the position of a jam, a sheet having the same printed contents is inspected twice, and hence in this case the sheet is determined as a defective sheet by sheet duplication inspection (i.e. page duplication check).

To avoid such a problem, jam recovery processing is not automatically started after removing the jammed sheet, but the system waits for a user instruction, and then starts jam recovery processing based on the user instruction. This enables the user to confirm a page from which printing is to be started in jam recovery processing, and start jam recovery processing at a desired timing after making a new setting of the sheet inspection device as required. This conventional technique is described e.g. in Japanese Laid-Open Patent Publication (Kokai) No. 2005-001837.

However, in jam recovery processing, a defective sheet is detected as a duplicate of the same sheet, in a case where a jam occurs on the downstream side of the sheet inspection device, and when a jam occurs on the upstream side of the sheet inspection device, it is unnecessary to make a new setting of the sheet inspection device.

That is, if the same handling is set in jam recovery processing regardless of a position where a jam occurs, even when a user need not make a setting of the sheet inspection device as to a page from which the inspection should be resumed, jam recovery processing is started only after waiting for a user instruction.

Therefore, when a jam occurs, the user has to always judge whether or not it is necessary to make a setting of the sheet inspection device for a page from which the inspection is to be resumed, by checking a removed jammed sheet and an image printed on the last sheet stacked on a discharge tray, which complicates the jam processing operation.

SUMMARY OF THE INVENTION

The present invention provides an image forming apparatus that enables a user to easily determine whether or not it is necessary to make a setting of a sheet inspection device for a page from which inspection is to be resumed, and is capable of improving jam processing efficiency.

In a first aspect of the present invention, there is provided an image forming apparatus comprising an image forming unit configured to form an image on a sheet, a conveying path for conveying a sheet supplied from the image forming unit, an inspection unit configured to inspect the image on a sheet being conveyed through the conveying path, a display unit configured to display information, and a controller that causes the image forming unit to interrupt image formation when a jam occurs in the conveying path, and the image forming unit to resume formation of images including respective images formed on jammed sheets, after the jammed sheets are removed, wherein the controller causes, in a case where one of the jammed sheets is on a downstream side of the inspection unit, the image forming unit to resume the image formation from an image formed on the one of the jammed sheets, based on a user instruction for resuming the image formation.

In a second aspect of the present invention, there is provided an image forming apparatus comprising an image forming unit configured to form an image on a sheet, a conveying path for conveying a sheet supplied from the image forming unit, an inspection unit configured to inspect the image on a sheet being conveyed through the conveying path, a display unit configured to display information, and a controller that causes the image formation unit to resume formation of images including respective images formed on jammed sheets, in a case where a jam occurs in the conveying path, wherein the controller causes, in a case where one of the jammed sheets is on an upstream side of the inspection unit, the image forming unit to resume the image formation from the image formed on the one of the jammed sheets.

In a third aspect of the present invention, there is provided an image forming apparatus comprising an image forming unit configured to form an image on a sheet, a conveying path for conveying a sheet supplied from the image forming unit, an inspection unit provided configured to inspect the image on a sheet being conveyed through the conveying path, a display unit configured to display information, and a controller that causes the image formation unit to resume formation of images including respective images formed on jammed sheets, in a case where a jam occurs in the conveying path, wherein the controller causes, in a case where one of the jammed sheets is on a downstream side of the inspection unit, the inspection unit to exclude sheet duplication inspection for detecting duplication of a plurality of sheets on which the same image is formed, from items of inspection.

According to the present invention, only when one of jammed sheets is on the downstream side of the inspection unit, printing is resumed based on a user instruction for resuming the image formation. This enables the user to easily determine whether or not it is necessary to make a new setting of the sheet inspection device, and it is possible to improve the jam processing efficiency.

Further features of the present invention will become apparent from the following description of exemplary embodiments (with reference to the attached drawings).

BRIEF DESCRIPTION OF THE DRAWINGS

FIGS. 11A to 11D are diagrams useful in explaining a problem which occurs in jam recovery processing.

DESCRIPTION OF THE EMBODIMENTS

The present invention will now be described in detail below with reference to the accompanying drawings showing embodiments thereof.

Figure 1:
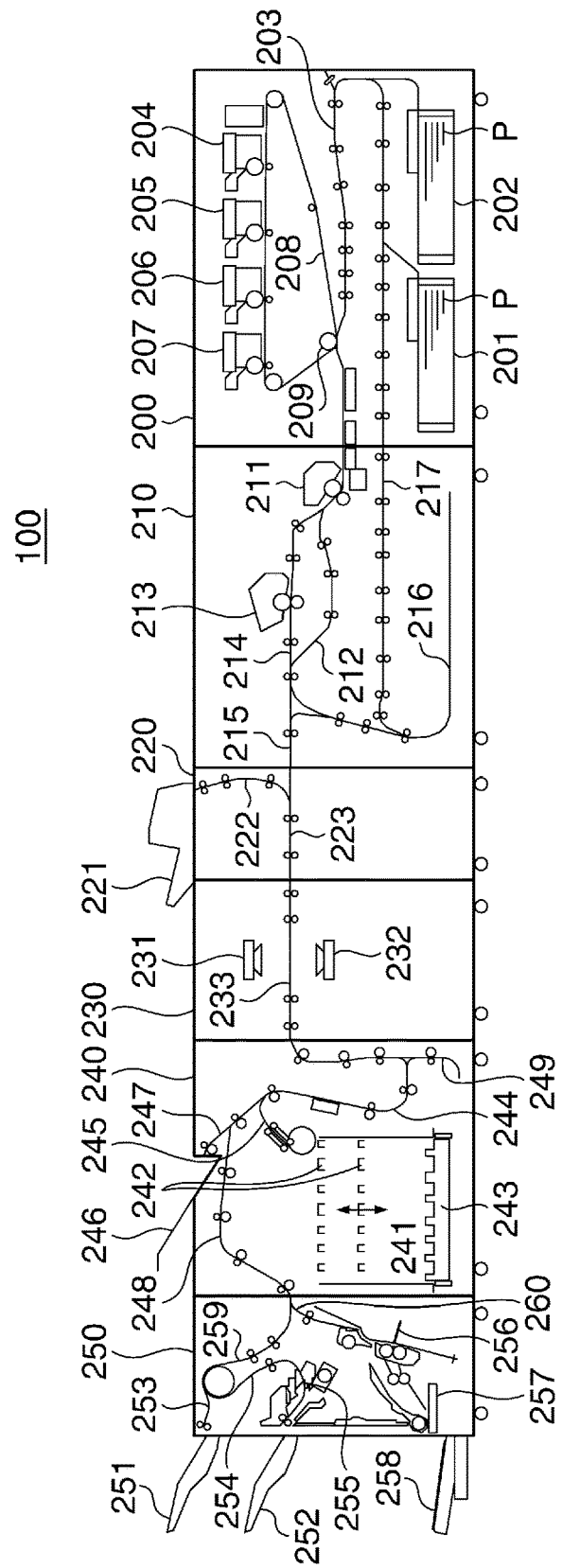
FIG. 1 is a schematic cross-sectional view of a printing apparatus as an image forming apparatus according to an embodiment of the present invention.

FIG. 1 is a schematic cross-sectional view of a printing apparatus 100 as an image forming apparatus according to an embodiment of the present invention.

Referring to FIG. 1, the printing apparatus 100 is mainly comprised of an image forming unit 200, an image fixing unit 210, an inserter 220, a camera unit 230, a large-capacity stacker 240, and a post-processing apparatus (finisher) 250.

The image forming unit 200 forms an image, and outputs the formed image onto a sheet. The image forming unit 200 includes four image forming stations 204 to 207, an intermediate transfer belt 208 arranged below the image forming stations 204 to 207, a sheet conveying path 203, and sheet feed decks 201 and 202. A secondary transfer roller 209 is arranged at a position where the intermediate transfer belt 208 meets the sheet conveying path 203, and this position is hereafter referred to as a secondary transfer position.

The sheet feed decks 201 and 202 accommodate respective different types of sheets. The sheet feed decks 201 and 202 each separate a sheet P at the top of a sheet bundle stored therein one by one, and convey the sheet P to the sheet conveying path 203. The image forming stations 204 to 207 form toner images using color toners of Y (yellow), M (magenta), C (cyan), and K (black), respectively. The formed toner images are primarily transferred onto the intermediate transfer belt 208 in a superimposed manner to form a color image.

The intermediate transfer belt 208 is rotated e.g. in a clockwise direction as viewed in FIG. 1, and the toner image transferred on the intermediate transfer belt 208 is transferred to the sheet P conveyed via the sheet conveying path 203 at the secondary transfer position. The sheet P on which the toner image has been transferred is conveyed into the image fixing unit 210 arranged on a downstream side of the image forming unit 200.

The image fixing unit 210 fixes the toner image, transferred onto the sheet P, to the sheet P. The image fixing unit 210 includes a sheet conveying path 214, a first fixing unit 211 and a second fixing unit 213 which are arranged on the sheet conveying path 214.

The image fixing unit 210 further includes a sheet conveying path 212 which is branched from the sheet conveying path 214 at a location downstream of the first fixing unit 211 to bypass the second fixing unit 213. Further, the image fixing unit 210 includes a sheet conveying path 215 extending downstream continuously from the sheet conveying path 214, a sheet inversion path 216 which is branched from the sheet conveying path 214, and a double-sided conveying path 217 which is connected to the sheet inversion path 216. The first and second fixing units 211 and 213 each include a pressure roller and a heating roller, and when a sheet P passes between the rollers, toner is subjected to melting and pressure fixing by the rollers, whereby the toner image is fixed onto the sheet P.

The sheet P, which is conveyed from the image forming unit 200 and has the toner image fixed thereon by the fixing unit 211, is conveyed to the sheet conveying path 215 through the sheet conveying path 212. In a case where processing for melting and pressure fixing is further required to fix the toner image depending on a type of the sheet, the sheet P is conveyed to the second fixing unit 213 after passing through the first fixing unit 211, for additionally subjecting the sheet P to melting and pressure fixing, and then the sheet P is conveyed to the sheet conveying path 215 through the sheet conveying path 214.

When an image formation mode is a double-sided printing mode, the sheet P is conveyed into the sheet inversion path 216, and after having the front and reverse sides thereof inverted in the sheet inversion path 216, the sheet P is conveyed into the double-sided conveying path 217. Then, the sheet P is conveyed to the secondary transfer position, wherein an image is transferred onto the second side of the sheet P.

The inserter 220 arranged on a downstream side of the image fixing unit 210 inserts a new sheet in the sheet conveying path. The inserter 220 includes an inserter tray 221 and an inserter path 222. The inserter 220 feeds a sheet P to a sheet conveying path 223 connected to the sheet conveying path 215 of the image fixing unit 210, through the inserter path 222. This makes it possible to insert a new sheet P between a series of sheets conveyed from the image fixing unit 210 at a desired position, and convey the new sheet P to the downstream unit (camera unit 230). The inserter tray 221 accommodates sheets each for being inserted between a series of sheets.

The camera unit 230 arranged on a downstream side of the inserter 220 includes a sheet conveying path 233 connected to the sheet conveying path 223 of the inserter 220, and cameras 231 and 232, which are disposed in a manner opposed to each other at respective locations above and below the sheet conveying path 233. The camera 231 reads an upper surface of the sheet P, and the camera 232 reads a lower surface of the sheet P. The camera unit 230 reads images on the sheet P using the cameras 231 and 232 when the sheet P conveyed in the sheet conveying path 233 reaches a predetermined position, and sends the read images of the sheet P to a sheet inspection device 150 (see FIG. 2), not shown in FIG. 1. Note that the cameras 231 and 232 substantially form part of the sheet inspection device 150.

The large-capacity stacker 240 arranged on a downstream side of the camera unit 230 is a stacker that is capable of stacking a large volume of sheets therein. The large-capacity stacker 240 includes sheet conveying paths 244, 245, 247, and 248, including an inversion portion 249, and a stack tray 241 for stacking sheets. The stack tray 241 is comprised of a lift table 242 and an eject table 243.

The sheet P having passed through the camera unit 230 is conveyed into the large-capacity stacker 240 through the sheet conveying path 244. The sheet P conveyed into the large-capacity stacker 240 is stacked on the lift table 242 of the stack tray 241 via the sheet conveying path 245 from the sheet conveying path 244. When the lift table 242 has no sheet stacked thereon, it is at an upper one of two positions illustrated by way of example in FIG. 1. As stacking of a sheet bundle proceeds, the lift table 242 is moved downward by an amount corresponding to the height of the stacked sheet bundle to a lower one of the two positions illustrated by way of example in FIG. 1, and the position of the lift table 242 is controlled such that the top of the stacked sheet bundle is always at a fixed height.

When stacking of the sheet bundle is completed, or the lift table 242 is fully stacked with sheets, the lift table 242 is moved downward to a position of the eject table 243. The lift table 242 and the eject table 243 each have bars for supporting a sheet bundle which are arranged such that bars of one table and bars of the other table are located in an alternating manner. Therefore, when the lift table 242 is moved downward to reach a position lower than the eject table 243, the sheet bundle is transferred onto the eject table 243.

Further, the large-capacity stacker 240 includes an escape tray 246 as a discharge tray. The escape tray 246 is a tray used to discharge sheets each of which is determined as a defective sheet by the sheet inspection device 150.

In the present specification, a defective sheet refers to a sheet having an image transferred thereon, which is different from an image to be originally formed on the sheet, a sheet having part thereof bent, and the like. Examples of the defective sheet include a sheet on which part of an image, such as a bar code, is missing, image sheets on which images have been printed in a different order from the original order of images to be printed, and a surplus sheet generated in a case where the same image is printed in duplicate on a plurality of sheets. Note that also in a case where an image to be originally formed is missing, i.e. the image is not formed on a sheet, the sheet inspection device 150 determines that the sheet is defective.

The defective sheet is conveyed from the sheet conveying path 244 to the escape tray 246 through the sheet conveying path 247. Further, in a case where the sheet P is conveyed to the post-processing apparatus (finisher) 250, described hereinafter, which is arranged on a downstream side of the large-capacity stacker 240, the sheet P is conveyed through the sheet conveying path 248. The inverting portion 249 for inverting the sheet P is connected to the sheet conveying path 244.

The inverting portion 249 is also used for stacking a sheet P on the stack tray 241. That is, the large-capacity stacker 240 has a mechanical configuration in which when stacking a sheet P on the stack tray 241, the sheet P is flipped and then stacked on the lift table 242, and hence the sheet P is inverted upside down. For this reason, in a case where it is necessary to make the orientation of a sheet P the same between when the sheet P is input and when the sheet is output, the sheet P is inverted once by the inverting portion 249 before being stacked on the stack tray 241. In a case where the sheet P is conveyed to the escape tray 246 or is conveyed to the finisher 250 on the downstream side, the sheet P is discharged without being flipped for stacking, and hence the inversion operation by the inverting portion 249 is not performed.

The finisher 250 arranged on the downstream side of the large-capacity stacker 240 performs finishing processing on a sheet P conveyed thereto using a function designated by a user. The finisher 250 has finishing functions, such as stapling (stapling at one position/two positions), punching (two holes/three holes), and saddle-stitching bookbinding.

The finisher 250 includes sheet conveying paths 259, 253, 254, 257, and 260 which are connected to the sheet conveying path 248 of the large-capacity stacker 240, discharge trays 251 and 252, and a saddle-stitching bookbinding tray 258. A sheet P conveyed into the finisher 250 is discharged onto the discharge tray 251 e.g. through the sheet conveying paths 259 and 253. However, a sheet is not subjected to finishing processing, such as stapling, in a case where the sheet is conveyed along the sheet conveying path 253. To perform finishing processing, such as stapling, on a sheet P, the sheet P is conveyed into a processing section 255 through the sheet conveying paths 259 and 254. Finishing processing designated by the user is performed on the sheet P conveyed into the processing section 255, and then, the sheet P is output to the discharge tray 252.

The discharge trays 251 and 252 can be moved up and down, respectively, and it is also possible to cause the discharge tray 251 to move downward to a position at which a sheet P subjected to finishing processing by the processing section 255 is stacked thereon. In a case where saddle-stitching bookbinding is designated, sheets P are guided into the sheet conveying path 260 so as to perform stapling on the center of the sheets P by a saddle-stitching processing section 256, and then, the sheets P are folded into two, and are output to the saddle-stitching bookbinding tray 258 through the sheet conveying path 257. The saddle-stitching bookbinding tray 258 is formed as a belt conveyor, and a saddle-stitched book bundle stacked on the saddle-stitching bookbinding tray 258 is conveyed out e.g. to the left, as viewed in FIG. 1.

Figure 2:
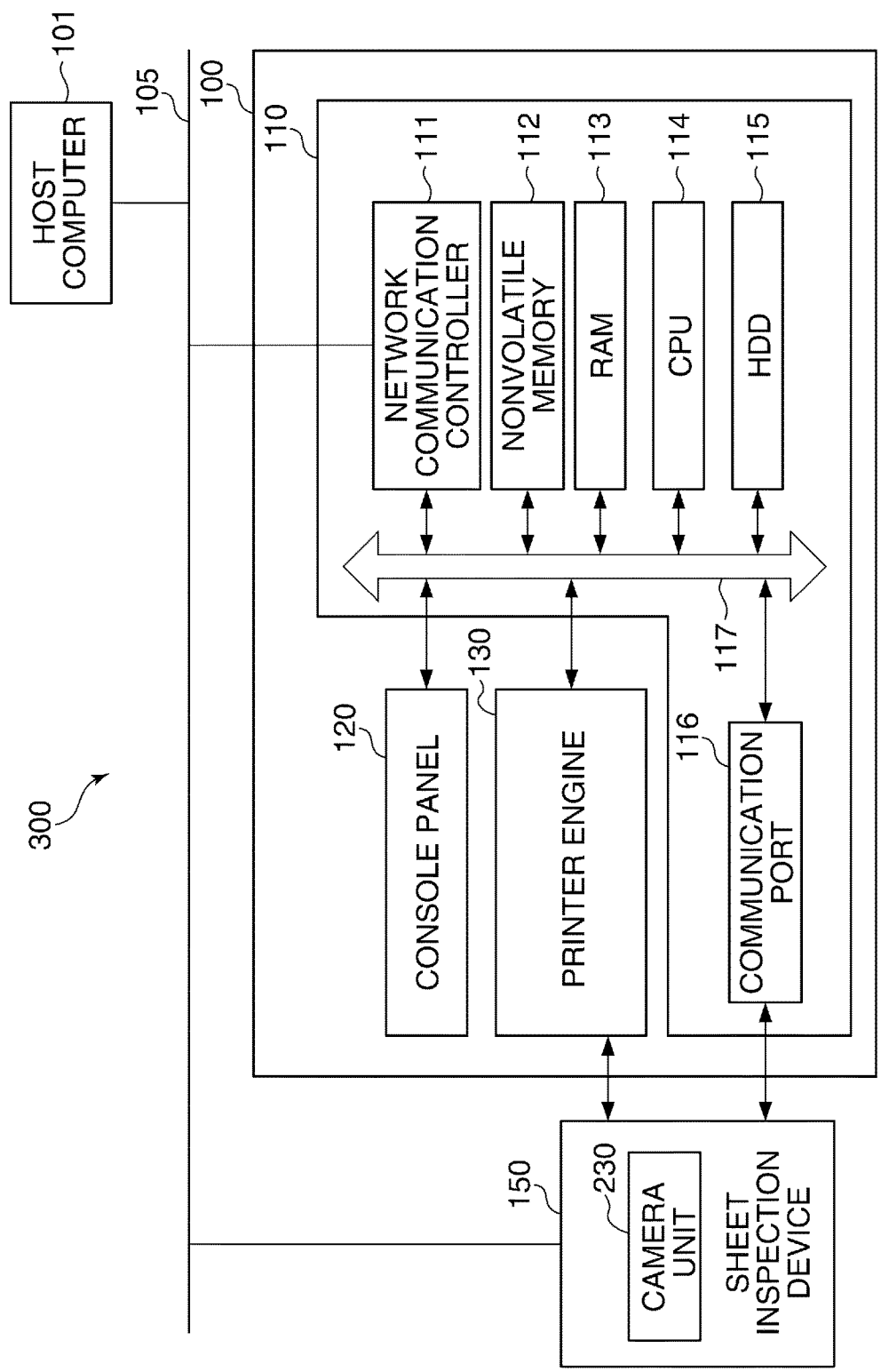
FIG. 2 is a schematic block diagram showing a hardware configuration and a control configuration of an image forming system including the printing apparatus.

FIG. 2 is a schematic block diagram showing a hardware configuration and a control configuration of the image forming system 300 including the printing apparatus 100.

Referring to FIG. 2, the image forming system 300 is mainly comprised of the printing apparatus 100 as the image forming apparatus, a host computer 101, and the sheet inspection device 150. The printing apparatus 100, the host computer 101, and the sheet inspection device 150 are interconnected by a communication line 105. Although FIG. 2 shows one host computer 101, one printing apparatus 100, and one sheet inspection device 150, each of them may be provided in plurality.

The host computer 101 acquires information input by a user using an input device, not shown, generates a print job to be transmitted to the printing apparatus 100, and transmits the generated print job to the printing apparatus 100. Further, the host computer 101 also plays the role of a database storing e.g. documents, and is capable of performing database collation according to an inquiry from the sheet inspection device 150. Note that a server of the database may be provided separately from the host computer 101.

The printing apparatus 100 includes a controller 110, a console panel 120, and a printer engine 130. The controller 110 performs various data processing operations, and controls the operation of the printing apparatus 100. Although in the present example, the controller 110 is incorporated in the printing apparatus 100, the controller 110 can be provided independently of the printing apparatus 100, and be connected to the printing apparatus 100 by a communication line. The construction of the controller 110 will be described in detail hereinafter.

The console panel 120 receives various operations input by a user e.g. using a touch panel, and displays information provided from the apparatus to the user. The printer engine 130 includes all the component elements related to printing, described above with reference to FIG. 1, and is controlled by the controller 110 so as to physically print generated image data on a sheet P as print paper.

The sheet inspection device 150 includes the camera unit 230, and performs image inspection using a photographed image of a sheet, which is obtained by photographing the sheet using the camera unit 230. The sheet inspection device 150 is connected to the communication line 105 to receive the settings of inspection items, a comparison source image, and so on, from the host computer 101. Further, the sheet inspection device 150 receives trigger events associated with inspection start, inspection end, inspection interruption, inspection resumption, and so forth, respectively, from the host computer 101, and in a case where inspection is to be resumed, it is possible to set a page from which inspection is to be resumed, for the sheet inspection device 150. By providing the sheet inspection device 150 with the camera unit 230, the accuracy of sheet inspection is improved.

Next, the controller 110 will be described. The controller 110 includes a network communication controller 111, a nonvolatile memory 112, a RAM 113, a CPU 114, an HDD 115, and a communication port 116, and these units are interconnected via a system bus 117.

The network communication controller 111 controls communication with an external network connected to the communication line 105. The nonvolatile memory 112 is a nonvolatile storage device, and stores a control program used at the start of the apparatus, and so forth. Various control programs are read from the nonvolatile memory 112 and are loaded into the RAM 113. The CPU 114 executes the control programs loaded into the RAM 113, and performs centralized control over image signals and various devices. The HDD 115 is used for temporarily storing large-volume data, such as image data and various setting data, or holding such large-volume data for a long term. The communication port 116 receives an electric signal indicative of a result of inspection from the sheet inspection device 150.

The system bus 117 connects the controller 110, and the devices in the printing apparatus 100, such as the operation panel 120 and the printer engine 130, to each other. Note that the RAM 113 also functions as a main memory and a work memory for the CPU 114. Further, the control programs and an operating system are stored not only in the nonvolatile memory 112, but also sometimes in the HDD 115. Further, an NVRAM, not shown, may be provided, and mode setting information of the printing apparatus, which is input from the console panel 120, may be stored in the NVRAM.

Hereafter, a description will be given of a print stopping process performed in response to the occurrence of a jam by the printing apparatus 100 in FIG. 2.

Figure 3:
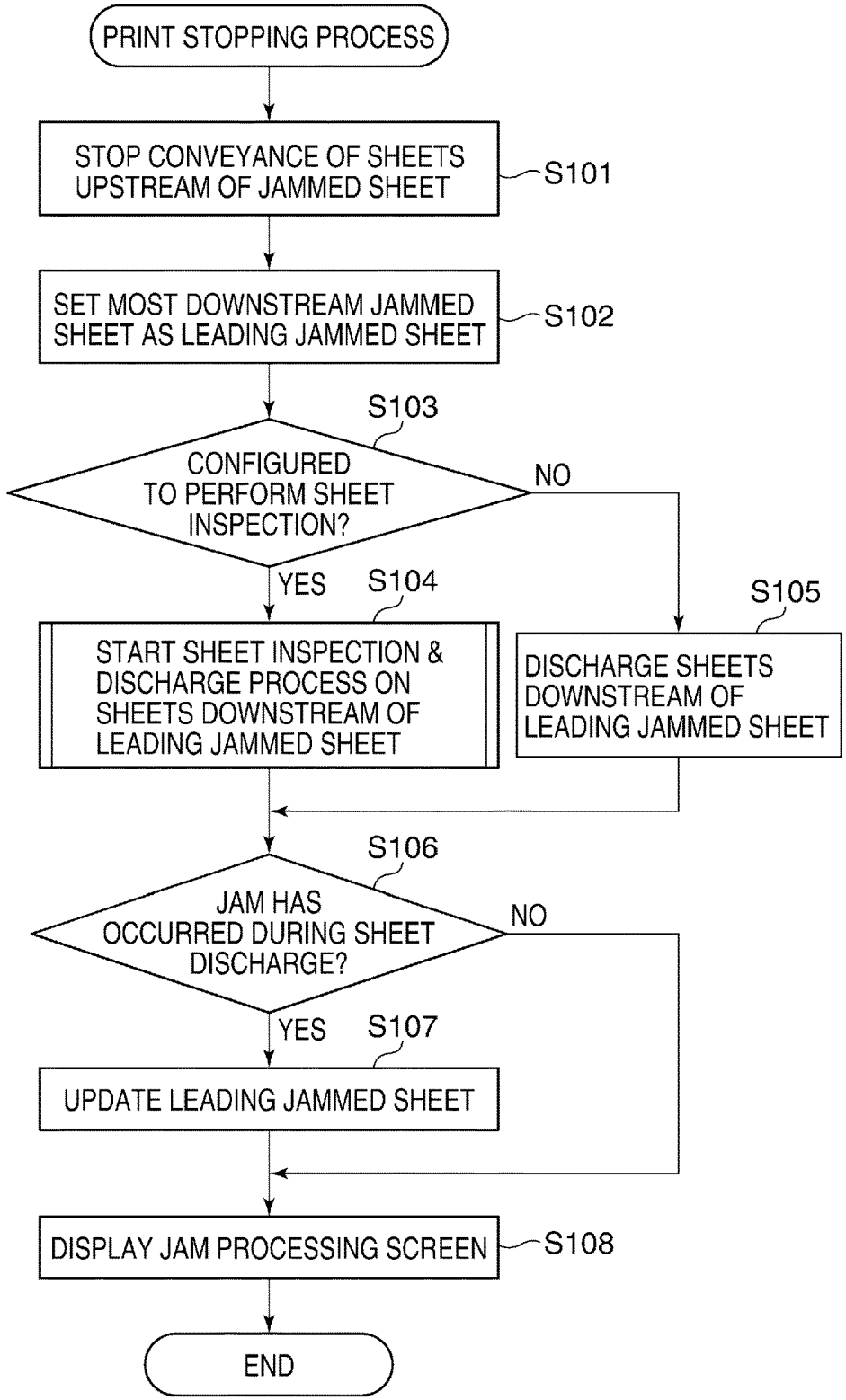
FIG. 3 is a flowchart of a print stopping process performed by the printing apparatus according to occurrence of a jam.

FIG. 3 is a flowchart of the print stopping process performed by the printing apparatus 100 in response to the occurrence of a jam. This print stopping process is performed by the CPU 114 of the printing apparatus 100, which executes a print stopping process program loaded into the RAM 113 from the HDD 115 storing the same.

Referring to FIG. 3, when the print stopping process is started in response to the occurrence of a jam, first, the CPU 114 stops conveyance of sheets on an upstream side of a jammed sheet as a cause of the jam (step S101). By preventing the sheets on the upstream side of the jammed sheet from being conveyed after occurrence of the jam, all of the sheets on the upstream side of the jammed sheet, which have already been started to be conveyed, are handled as jammed sheets which are required to be manually removed by a user.

Then, the CPU 114 sets a jammed sheet which is located most downstream in the sheet conveying path, as a leading jammed sheet of internal parameters (step S102). This causes the jammed sheet at the most downstream location to be set to a page from which printing is to be resumed in a jam recovery process, described hereinafter. This makes it possible to recover the jammed sheets.

Then, the CPU 114 determines whether or not the printing apparatus 100 has a sheet inspection function and is configured to perform inspection on sheets P (step S103). A setting of whether or not to perform sheet inspection can be made and stored in the nonvolatile memory 112 of the controller 110 by a user from the console panel 120, or can be made and stored in a print job which is sent from the host computer 101.

If it is determined in the step S103 that the printing apparatus 100 is configured to perform inspection on sheets P (YES to the step S103), the CPU 114 proceeds to a step S104. In this step S104, the CPU 114 starts sheet inspection and sheet discharge, by handling the sheets on the downstream side of the leading jammed sheet as valid sheets (step S104). The sheet inspection and the sheet discharge process associated with the sheet inspection will be described hereinafter with reference to FIG. 4.

After the sheet inspection and discharge process is started (step S104), the CPU 114 determines whether or not a jam has occurred while the sheets are being discharged (step S106). If it is determined in the step S106 that a jam has occurred (YES to the step S106), the CPU 114 proceeds to a step S107. In this step, the CPU 114 updates the leading jammed sheet set in the step S102 to a jammed sheet which has newly caused the jam (step S107). This is because, in this case, the jam has occurred on a further downstream side of the leading jammed sheet set in the step S102, and hence it is necessary to update the leading jammed sheet.

After updating the leading jammed sheet (step S107), the CPU 114 displays a screen for jam processing on the console panel 120 (step S108), followed by terminating the present print stopping process. Note that the jam recovery process (see FIG. 9), described hereinafter, is performed based on the screen for jam processing, which is displayed on the console panel 120.

On the other hand, if it is determined in the step S106 that a jam has not occurred (NO to the step S106), the CPU 114 proceeds directly to the step S108. In this step, the CPU 114 displays the screen for jam processing on the console panel 120 without changing the setting set in the step S102 (step S108), followed by terminating the present process.

Further, if it is determined in the step S103 that the printing apparatus 100 is not configured to perform inspection on sheets P (NO to the step S103), the CPU 114 proceeds to a step S105. In this step, since the printing apparatus 100 is not configured to perform sheet inspection, the CPU 114 discharges sheets on the downstream side of the leading jammed sheet as valid sheets without performing sheet inspection (step S105), and then proceeds to the step S106.

According to the print stopping process in FIG. 3, in print processing stopped in response to the occurrence of a jam, when discharging sheets on the downstream side of the leading jammed sheet, it is determined whether or not a jam has newly occurred (step S106). Then, if a jam has newly occurred, the CPU 114 updates the leading jammed sheet to a new jammed sheet as a cause of the new occurrence of the jam (step S107). This makes it possible to start the jam recovery process from an image corresponding to the most appropriate jammed sheet.

Hereafter, the sheet inspection and discharge process performed in the step S104 in FIG. 3 will be described.

Figure 4:
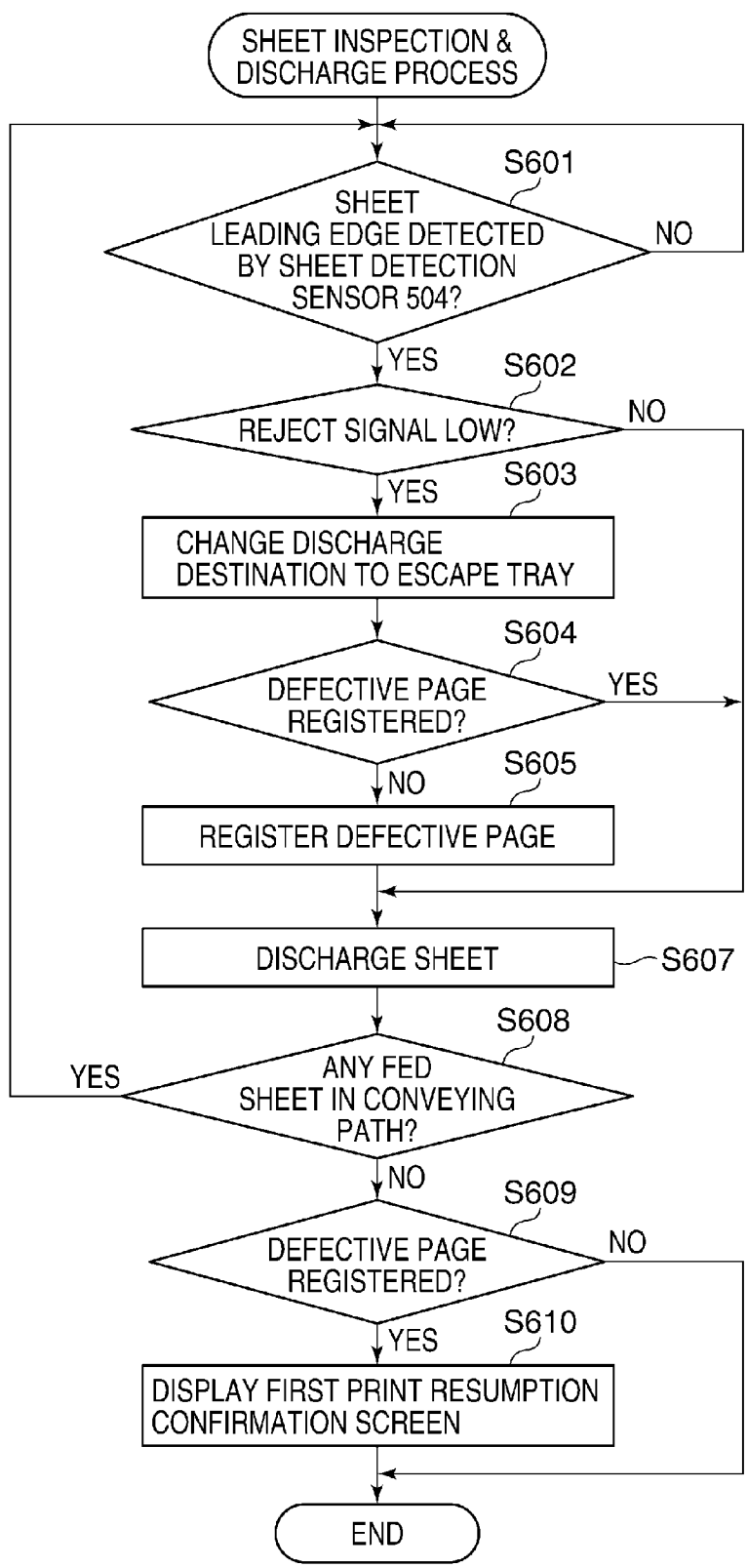
FIG. 4 is a flowchart of a sheet inspection and discharge process performed by the printing apparatus.

FIG. 4 is a flowchart of the sheet inspection and discharge process performed by the printing apparatus 100. This sheet inspection and discharge process is performed by the CPU 114 of the controller 110 of the printing apparatus 100, according to a sheet inspection and discharge process program stored in the HDD 115 and loaded into the RAM 113 for execution.

When the sheet inspection and discharge process is started, first, the CPU 114 determines whether or not a sheet sensor 504 (see FIG. 5) disposed at an inlet of the large-capacity stacker 240 detects a leading edge of a sheet P being conveyed, and waits until the sheet sensor 504 detects the leading edge of the sheet P (step S601).

Figure 5:
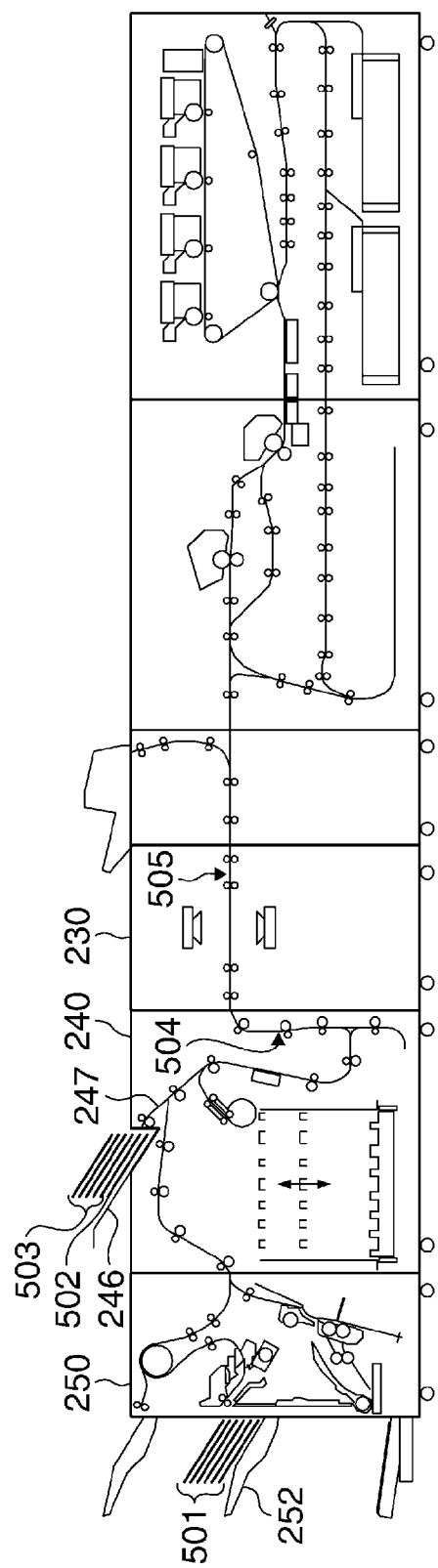
FIG. 5 is a diagram showing positions of sheet sensors provided in the printing apparatus.

FIG. 5 is a diagram showing locations of the sheet sensor 504 and a sheet sensor 505 provided in the printing apparatus 100.

Referring to FIG. 5, the sheet sensor 504 and the sheet sensor 505 are disposed at the inlet of the large-capacity stacker 240 and an inlet of the camera unit 230, on respective associated ones of the sheet conveying paths for conveying sheets P. The sheet sensors 504 and 505 each detect a sheet P passing through the associated sheet conveying paths.

As described with reference to FIG. 1, the cameras 231 and 232 of the camera unit 230 each photograph an image of a sheet P being conveyed along the associated sheet conveying path, and the sheet inspection device 150 inspects the sheet P based on the photographed images according to the inspection items set in advance.

Figures 6A, 6B:
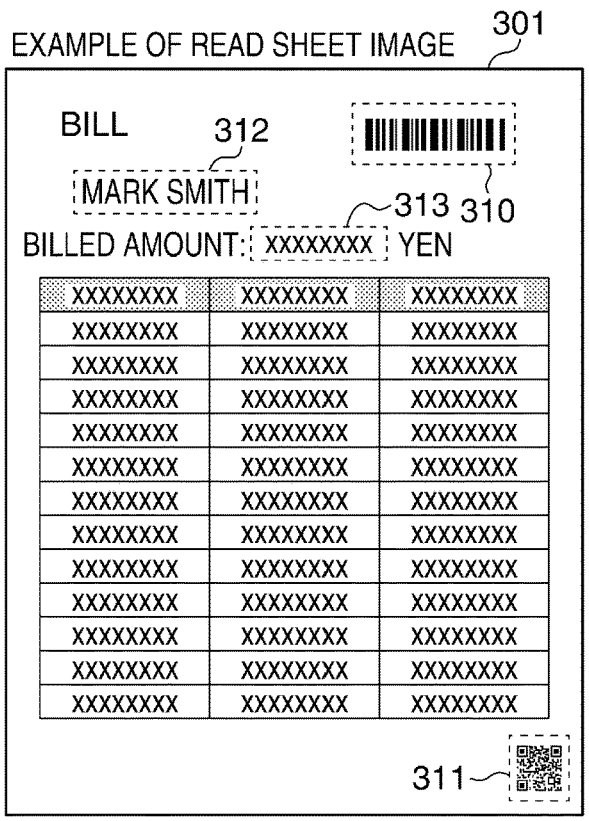
FIG. 6A is a diagram showing an example of an image inspected by the sheet inspection device.
FIG. 6B is a diagram of a database of inspection items of inspection performed by the sheet inspection device.

FIGS. 6A and 6B are diagrams showing an image inspected by the sheet inspection device and a database of the inspection items, respectively. The inspected image, denoted by reference numeral 301, in FIG. 6A is an image photographed by the camera unit 230, and the photographed image 301 includes inspection areas 310 to 313 as inspection targets.

Examples of the inspection items include bar code readability inspection, printed content inspection, sheet duplication inspection, and sheet missing inspection (i.e. page missing check). More specifically, the sheet inspection device 150 determines whether or not a sheet P is a defective sheet based on whether or not a bar code printed in the inspection area 310 can be read. If the bar code can be read, it is determined that the bar code is normally printed, whereas if not, it is determined that the print of the bar code is defective.

Further, the sheet inspection device 150 reads and analyzes a QR code (registered trademark) printed in the inspection area 311, and collates the read data with the database on the host computer 101 to identify the data of the read sheet. For example, a record number 321 in the database on the host computer, shown in FIG. 6B, is derived from the QR code (registered trademark) printed in the inspection area 311.

Further, the sheet inspection device 150 extracts images included in the inspection areas 312 and 313 as character data items, respectively, by OCR (Optical Character Recognition). The sheet inspection device 150 collates the extracted character data items with a name record 322 and an amount record 323 to thereby determine whether or not the printed contents are correct.

In FIGS. 6A and 6B, the inspection area 312 in FIG. 6A is collated with the name record 322 in FIG. 6B, and the inspection area 313 in FIG. 6A is collated with the amount record 323 in FIG. 6B, and if there is a mismatch between them, it is determined that the sheet is defective. At the start of a print job, the sheet inspection device 150 receives a record number list of records to be printed, from the host computer 101, as an inspection start event. Therefore, if the same record number is derived from the QR code (registered trademark) 311 a plurality of times before the end of the print job, the sheet inspection device 150 determines that a duplicate sheet is generated, and hence that there is a failure in printing. Further, when an inspection termination event is received from the host computer 101, if the record number list received at the start of the print job includes any record number which has not been derived, the sheet inspection device 150 determines that there is a missing sheet, and hence that there is a failure in printing.

When it is determined in any of the barcode readability inspection, the printed content inspection, the sheet duplication inspection, and so forth, that there is a failure, the sheet inspection device 150 outputs a defective sheet detection signal to the printing apparatus 100 via the communication port 116, and thereby causes the printing apparatus 100 to interrupt printing.

Figure 7:
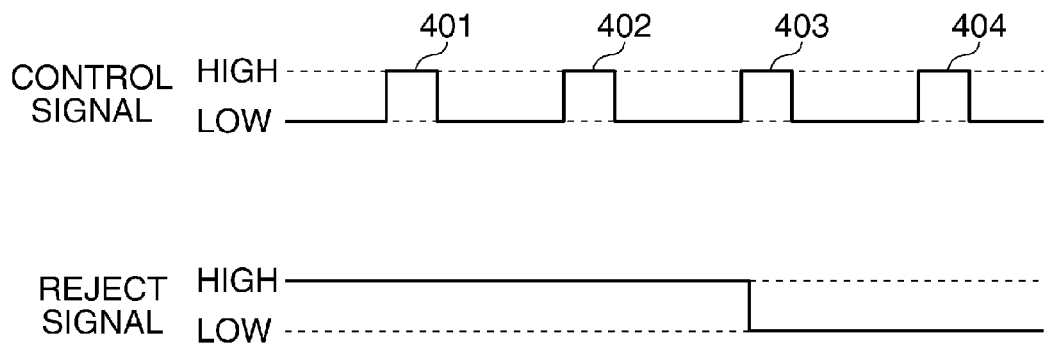
FIG. 7 is a timing diagram useful in explaining a defective sheet detection signal.

FIG. 7 is a timing diagram useful in explaining the defective sheet detection signal. The defective sheet detection signal is received by the controller 110 of the printing apparatus 100 from the sheet inspection device 150 via the communication port 116.

Referring to FIG. 7, the defective sheet detection signal for causing the printing apparatus 100 to interrupt printing is formed by a control signal and a reject signal. The control signal indicates that a sheet image read during passing of a sheet P in front of the camera unit 230 has been transferred to the sheet inspection device 150. The control signal is a pulse signal in which the signal value thereof is normally low, and when the sheet inspection device 150 receives a sheet image transferred thereto, the signal value thereof becomes high over a time period during which the sheet image is being inspected by the sheet inspection device 150. In FIG. 7, it is understood from pulses 401 to 404 that sheet images of respective four sheets have been transferred from the camera unit 230 to the sheet inspection device 150.

In the case of a double-sided print job, although the sheet images are read by the two cameras 231 and 232, since a pulse is output on a sheet-by-sheet basis, one pulse is output even when images are read from both sides. Note that in a case where images on both sides are read and two images are transferred to the sheet inspection device 150, two pulses may be continuously output. The controller 110 identifies which sheet, out of sheets that are printed, each pulse corresponds to, by counting the pulses of the control signal.

On the other hand, a reject signal is indicative of whether or not a defective sheet is detected. If the reject signal shifts from high to low while the control signal is high, this indicates the corresponding sheet P is detected to be defective. It is clear from FIG. 7 that the sheet corresponding to the pulse 403 is detected to be defective. Note that in the present embodiment, when a defective sheet is detected, the sheet inspection device 150 interrupts inspection with respect to the following sheets. Then, the reject signal remains low until an inspection resumption event or an inspection termination event is notified from the host computer 101.

The sheet inspection device 150 is further capable of performing other various inspections, such as color misregistration inspection, color tone inspection, and full image comparison inspection between a read image and original data. The contents of inspection are not particularly limited. Note that in the present embodiment, the settings of the inspection areas and the inspection contents for the sheet inspection device 150 are input e.g. from the host computer 101 via the communication line 105. When the full image comparison inspection is performed, the sheet inspection device 150 receives a comparison source image e.g. from the host computer 101. Further, the sheet inspection device 150 may be configured differently such that it includes an operation section and settings of the inspection areas and the inspection contents are made from the operation section.

Here, a description will be given of a sheet discharge operation performed according to the sheet inspection, with reference to FIG. 5.

As described above, when the control signal is high, if the reject signal remains high without shifting to low, a sheet corresponding to the pulse of the control signal is recognized as a normal sheet. Normal sheets are each discharged onto the discharge tray 252 of the finisher 250, and are stacked as a sheet bundle 501.

On the other hand, if the reject signal shifts from high to low when the control signal is high, the controller 110 recognizes a sheet corresponding to the pulse of the control signal as a defective sheet. The controller 110 having received a signal indicative of the defective sheet identifies a sheet which is determined as the defective sheet, based on association of each pulse and each sheet which is performed by the controller 110 through counting the pulses of the control signal.

Here, let it be assumed that a sheet 502 is a defective sheet. The controller 110 changes the conveying path of the large-capacity stacker 240 to the sheet conveying path 247 so as to prevent the defective sheet 502 from being mixed in the sheet bundle 501 formed by normal sheets, and discharges the defective sheet 502 to the escape tray 246 which is a sheet discharge tray different from the discharge tray 252. When the defective sheet 502 is detected, the sheet inspection device 150 interrupts inspection on the following sheets 503, and hence the following sheets are each discharged onto the escape tray 246 as an uninspected sheet, similar to the defective sheet 502. To this end, at the time when it is detected that the leading edge of the sheet P has passed the sheet sensor 504, the controller 110 refers to the reject signal, and if the reject signal turns low, the conveying destination is changed to the sheet conveying path 247. With this, sheets conveyed after the detective sheet are all discharged onto the escape tray 246.

The sheet sensor 504 is disposed at a location where it is guaranteed that when the leading edge of a sheet passes the sheet sensor 504, inspection on the sheet is completed and the conveying destination can be changed to the sheet conveying path 247 in time.

Further, although described hereinafter with reference to FIGS. 10A and 10B, the sheet sensor 505 is disposed at a position where it is guaranteed that when the trailing edge of a sheet P passes the sheet sensor 505, inspection on the sheet P is completed. The controller 110 stops feeding of sheets when the reject signal has shifted to low, and temporarily stops the print job when the following sheets 503, which have already been fed, are all discharged onto the escape tray 246.

Referring again to FIG. 4, when the sheet sensor 504 detects a leading edge of a sheet P (YES to the step S601), the CPU 114 determines whether or not the reject signal corresponding to the sheet P is low (step S602). If the reject signal corresponding to the sheet P is low, the sheet P is determined as a defective sheet.

If it is determined in the step S602 that the reject signal corresponding to the sheet P is low (YES to the step S602), the CPU 114 proceeds to a step S603. In this step, the CPU 114 changes the conveying destination of the sheet P to the sheet conveying path 247 so as to discharge the sheet P onto the escape tray 246 (step S603).

After the conveying destination of the sheet P is changed to the sheet conveying path 247 (step S603), the CPU 114 determines whether or not a defective page has been registered as an internal parameter (step S604). If it is determined in the step S604 that a defective page has not been registered as an internal parameter (NO to the step S604), the CPU 114 proceeds to a step S605, and registers the defective page as the internal parameter (step S605). The defective page is registered so as to store a page from which printing is to be resumed, because it is necessary to start printing from a page detected to be defective when resuming printing.

After the defective page is registered (step S605), the CPU 114 discharges the sheet P (step S607). At this time, since it is determined in the step S602 that the reject signal is low, the sheet P is discharged onto the escape tray 246 different from the discharge tray 252.

Then, the CPU 114 determines whether or not there is any sheet, which has been fed, in the sheet conveying paths of the printing apparatus 100 (step S608). If it is determined in the step S608 that there is no sheet which has been fed (NO to the step S608), the CPU 114 proceeds to a step S609. In this step, the CPU 114 determines whether or not there is any defective page registered as an internal parameter (step S609). If it is determined in the step S609 that there is any defective page registered as an internal parameter (YES to the step S609), the CPU 114 displays a first print resumption confirmation screen 120-1, shown in FIG. 8, on the console panel 120 (step S610), followed by terminating the sheet inspection and discharge process.

Figure 8:
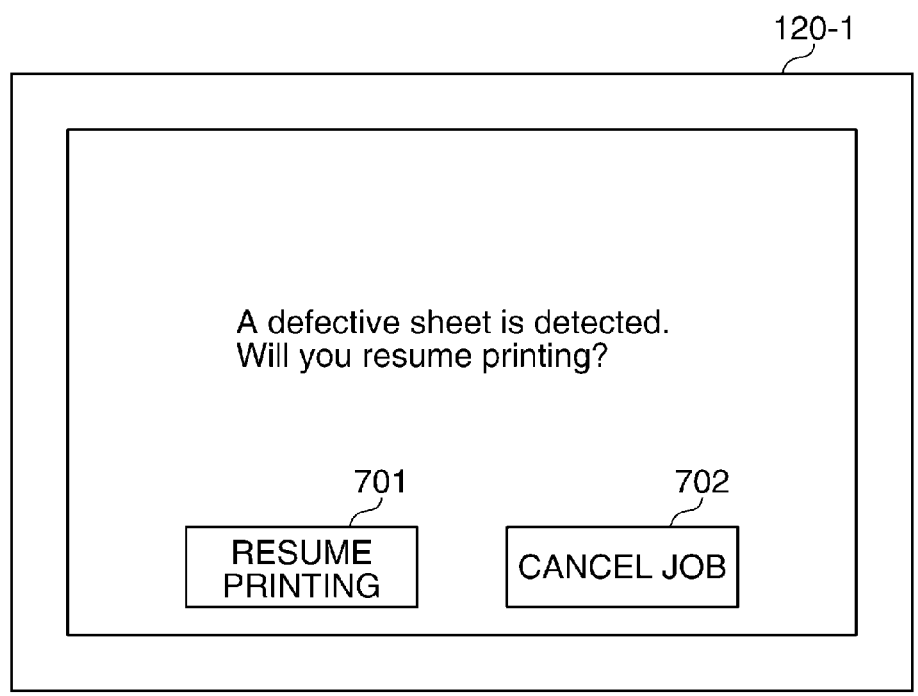
FIG. 8 is a diagram showing a first print resumption confirmation screen.

FIG. 8 is a diagram showing an example of the first print resumption confirmation screen. Referring to FIG. 8, a message "A defective sheet is detected. Will you resume printing?" is displayed on the display screen, and a print resumption key 701 and a job cancel key 702 are displayed below the message.

When the user touches the print resumption key 701, the controller 110 continues the print job to resume printing from the defective sheet. Further, when the user touches the job cancel key 702, the controller 110 cancels the print job. More specifically, when the sheet inspection device 150 detects a defective sheet, the print job is temporarily stopped, and the host computer 101 sets a page from which inspection is to be resumed, in the sheet inspection device 150. After that, when the user presses the print resumption key on the first print resumption confirmation screen 120-1 shown in FIG. 8, printing is resumed from the defective sheet. Note that by enabling a user to set the page from which inspection is to be resumed, for the sheet inspection device 150, through operating the host computer 101, the inspection may be resumed from a sheet other than the defective sheet. This increases variation of an object to be inspected when resuming inspection.

Referring again to FIG. 4, if it is determined in the step S609 that there is no defective page registered as an internal parameter (NO to the step S609), the CPU 114 terminates the present process. That is, if there is no registered defective page, the CPU 114 cannot determine a sheet from which printing is to be resumed, and hence the CPU 114 terminates the present process.

Further, if it is determined in the step S608 that there is any sheet which has been fed (YES to the step S608), the CPU 114 returns to the step S601, and repeats the steps S601 to S608. Further, if it is determined in the step S602 that the reject signal is not low, but high (NO to the step S602), the CPU 114 proceeds to the step S607. At this time, since it is determined in the step S602 that the reject signal is not low, but high, the sheet P is discharged onto the discharge tray 252 provided for discharging normal sheets.

Further, if it is determined in the step S604 that there is any registered defective page (YES to the step S604), the CPU 114 proceeds to the step S607, and discharges the sheet P. At this time, since it is determined in the step S602 that the reject signal is low, the sheet P is discharged onto the escape tray 246.

According to the sheet inspection and discharge process in FIG. 4, if it is determined that the sheet P is a defective sheet (YES to the step S602), the page having the image associated with the defective sheet is registered, and then the sheet P is discharged (step S607), whereafter the first print resumption confirmation screen 120-1 is displayed (step S610). With this, when the user touches the print resumption key 701, the controller 110 continues the print job to resume printing from the defective sheet. Note that, the user may be prompted to confirm the image (page) printed on the defective sheet from which sheet inspection is to be resumed, and then may be allowed to start printing including sheet inspection.

Next, a description will be given of the jam recovery process performed after the print stopping process in FIG. 3.

Figure 9:
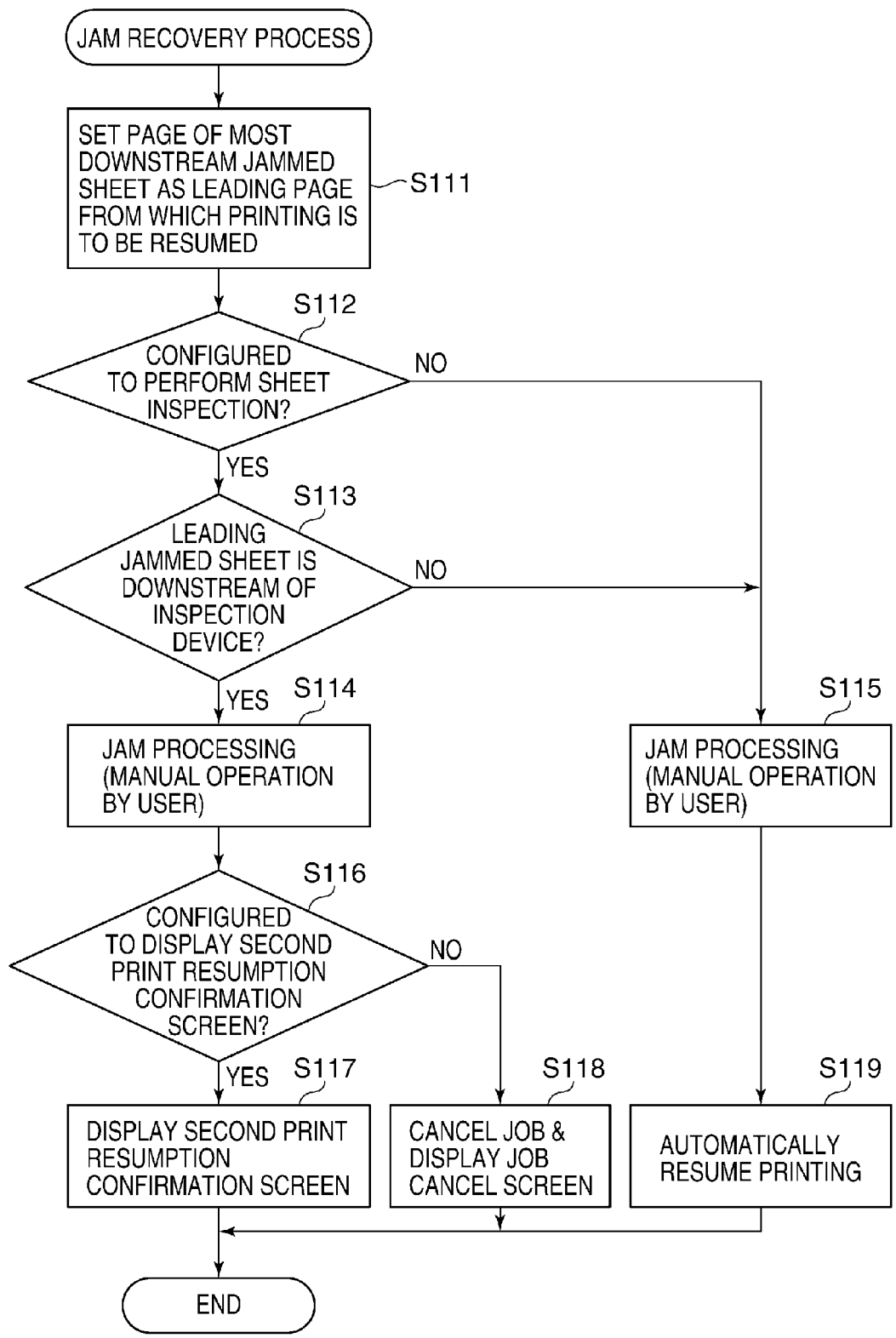
FIG. 9 is a flowchart of a jam recovery process.

FIG. 9 is a flowchart of the jam recovery process. This jam recovery process is performed by the CPU 114 of the controller 110 of the printing apparatus 100, according to a jam recovery process program stored in the HDD 115 and loaded into the RAM 113 for execution. The jam recovery process is started after the print stopping process in FIG. 3 is terminated.

Referring to FIG. 9, when the jam recovery process is started, first, the CPU 114 sets a page printed on the most downstream one of jammed sheets, which has been set as the leading jammed sheet in the step S102 or S107 in FIG. 3, as a leading page from which printing is to be resumed after jam processing (step S111). Then, the CPU 114 determines whether or not the printing apparatus 100 is configured to execute sheet inspection (step S112).

If it is determined in the step S112 that the printing apparatus 100 is configured to execute sheet inspection (YES to the step S112), the CPU 114 proceeds to a step S113, wherein the CPU 114 determines whether or not a leading jammed sheet as a cause of occurrence of a jam in the conveying paths is on the downstream side of the cameras 231 and 232 which are components of the sheet inspection device 150 (step S113). More specifically, with reference to an inspection completion boundary 801 which is set to a position of the sheet sensor 505 disposed on the upstream side of the cameras 231 and 232, the CPU 114 determines whether or not the leading jammed sheet is on the downstream side of the inspection completion boundary 801. The inspection completion boundary 801 refers to a boundary which guarantees completion of sheet inspection on a sheet P on condition that the trailing edge of the sheet P has passed the boundary.

Figure 10A:
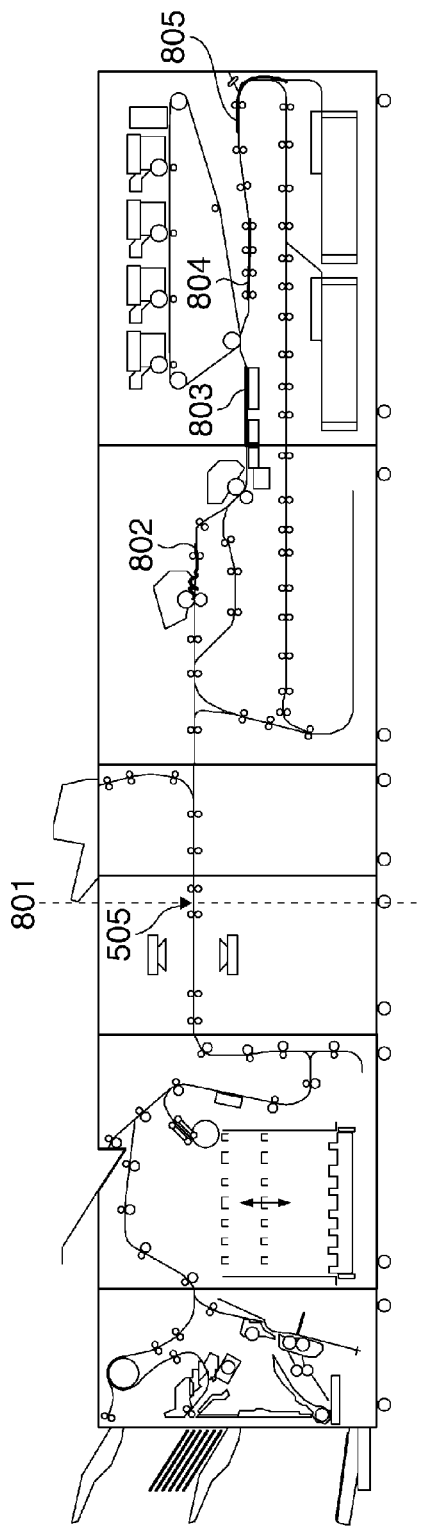
FIG. 10A is a diagram showing a positional relationship between a jammed sheet and an inspection completion boundary in the printing apparatus in a case where the jammed sheet is on an upstream side of the sheet inspection device.
Figure 10B:
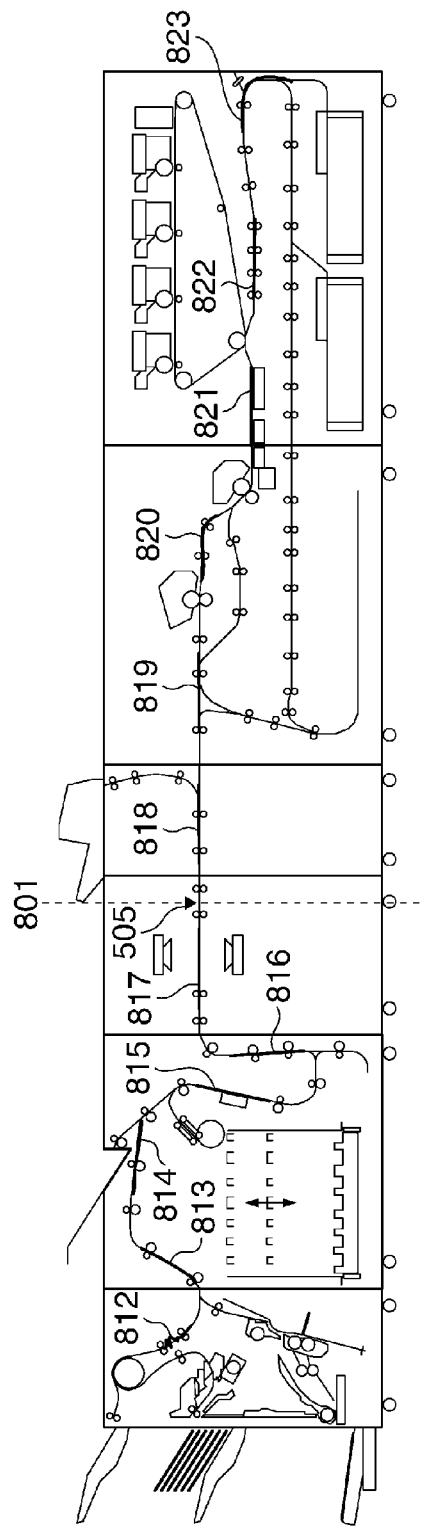
FIG. 10B is a diagram showing a positional relationship between a jammed sheet and the inspection completion boundary in the printing apparatus in a case where the jammed sheet is on a downstream side of the sheet inspection device.

FIGS. 10A and 10B are diagrams showing a positional relationship between jammed sheets and the inspection completion boundary 801 in the printing apparatus 100. FIG. 10A is a cross-sectional view of the printing apparatus 100 in a state where a jam has occurred on the upstream side of the cameras 231 and 232 forming the sheet inspection device 150 (hereinafter, these cameras are sometimes simply referred to as the "sheet inspection device 150") and the operation of the printing apparatus 100 is stopped.

Referring to FIG. 10A, a jammed sheet 802 is on the upstream side of the sheet inspection device 150, and sheets 803 to 805 which have been fed, and are on the further upstream side of the jammed sheet 802, are also handled as jammed sheets. Therefore, when the print job is resumed after the jammed sheets are removed by jam processing, printing is resumed from an image printed on the sheet 802 as a cause of the jam.

The printing apparatus 100 is not immediately stopped when the jam has occurred, and inspection using the cameras 231 and 232 is performed with respect to any sheet on the downstream side of the jammed sheet 802 as a valid sheet. Then, as a result of sheet inspection, if the sheet is determined as a normal sheet, the sheet is discharged onto the discharge tray 252, and then, the printing apparatus 100 is stopped.

In the present embodiment, the sheet inspection on a sheet P is completed when the trailing edge of the sheet P has passed the sheet sensor 505 disposed at the inspection completion boundary 801, but is not completed unless the trailing edge of the sheet P has passed the sheet sensor 505. In the case of FIG. 10A, all of the jammed sheets 802 to 805 are on the upstream side of the inspection completion boundary 801, i.e. the jammed sheets 802 to 805 are in a state before the sheet inspection, and hence a problem concerning sheet duplication is not caused.

On the other hand, FIG. 10B is a cross-sectional view of the printing apparatus 100 in a state where a jam has occurred on the downstream side of the sheet inspection device 150 and the operation of the printing apparatus 100 is stopped.

Referring to FIG. 10B, a leading jammed sheet 812 as a cause of the jam is on the downstream of the sheet inspection device 150, and sheets 813 to 823, which have been fed and are on the upstream side of the leading jammed sheet 812, are also handled as jammed sheets. Therefore, when the print job is resumed after the jammed sheets are removed by jam processing, printing is resumed from an image printed on the leading jammed sheet 812 as the cause of the jam.

In the case of FIG. 10B, the sheets 812 to 817 have passed the inspection completion boundary 801, and hence they are the inspected sheets. For example, even though the sheets 812 to 817 are determined as the normal sheets, printing is performed again by recovery processing after jam processing, and the sheets are inspected again, which causes the following problem:

FIGS. 11A to 11D are diagrams useful in explaining the problem caused in jam recovery processing.

Referring to FIGS. 11A to 11D, FIG. 11A shows printed pages of a print job executed by the printing apparatus 100, and the print job is a single-sided printing job for printing eight pages. In FIG. 11A, the printed pages of first to eighth pages are denoted by P1 to P8, respectively.

FIG. 11B shows an example of a state of a jam. The pages P1 to P4 have passed the inspection completion boundary 801, and sheet inspection on the pages P1 to P4 is completed. The pages P1 and P2 are determined as normal sheets by sheet inspection, and have already been discharged onto the discharge tray 252. The pages P3 to P8 are all jammed sheets, the pages P3 and P4 are determined as normal sheets by sheet inspection, and the pages P5 to P8 have not been inspected yet.

When the jam recovery process is performed in the state shown in FIG. 11B, printing is resumed from the page P3 as shown in FIG. 11C. The sheets passing the sheet inspection device 150 are as shown in FIG. 11D, and sheet inspection is performed in the order shown in FIG. 11D. Therefore, the pages P3 and P4 are inspected twice. That is, although the pages P3 (901) and P4 (902) which are the jammed sheets have already been determined as the normal sheets by sheet inspection before occurrence of the jam, the sheets P3 and P4 are to be inspected again as pages 903 and 904 due to resumption of printing after jam processing. Therefore, sheet inspection is to be performed twice with respect to the pages P3 and P4, and the pages P3 and P4 are determined as defective sheets due to sheet duplication inspection by the sheet inspection device 150.

To solve this problem concerning sheet duplication inspection, in the present embodiment, in a case where a jam has occurred on the downstream side of the sheet inspection device 150, jammed sheets are handled in a different manner from a case where a jam has occurred on the upstream side of the sheet inspection device 150, as described hereafter.

Referring again to FIG. 9, if it is determined in the step S113 that the leading jammed sheet is on the downstream side of the sheet inspection device 150, i.e. on the downstream side of the inspection completion boundary 801 (YES to the step S113), the CPU 114 proceeds to a step 114. In this step, the CPU 114 prompts the user to manually remove the jammed sheet(s) (step S114). Then, the CPU 114 determines whether or not the printing apparatus 100 is configured to display a second print resumption confirmation screen on the console panel 120 when the leading jammed sheet is on the downstream side of the inspection completion boundary 801 (step S116). Note that the user may be enabled to make a setting of whether or not to display the second print resumption confirmation screen on the console panel 120, through operating the console panel 120, and store the setting in the nonvolatile memory 112 of the controller 110. Further, the user may be enabled to set this setting in the print job by using the host computer 101.

If it is determined in the step S116 that the printing apparatus 100 is configured to display the second print resumption confirmation screen (YES to the step S116), the CPU 114 proceeds to a step S117. In this step, the CPU 114 displays the second print resumption confirmation screen on the console panel 120 so as to resume printing after jam recovery processing according to determination by the user (step S117), followed by terminating the present process.

Figure 12A:
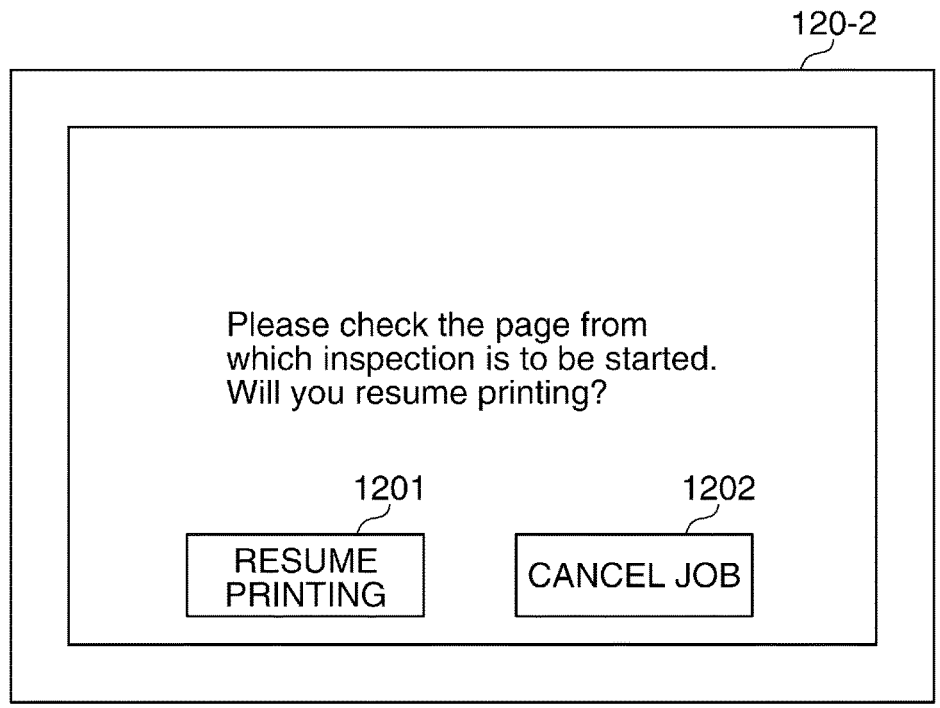
FIG. 12A is a diagram showing a second print resumption confirmation screen.
Figure 12B:
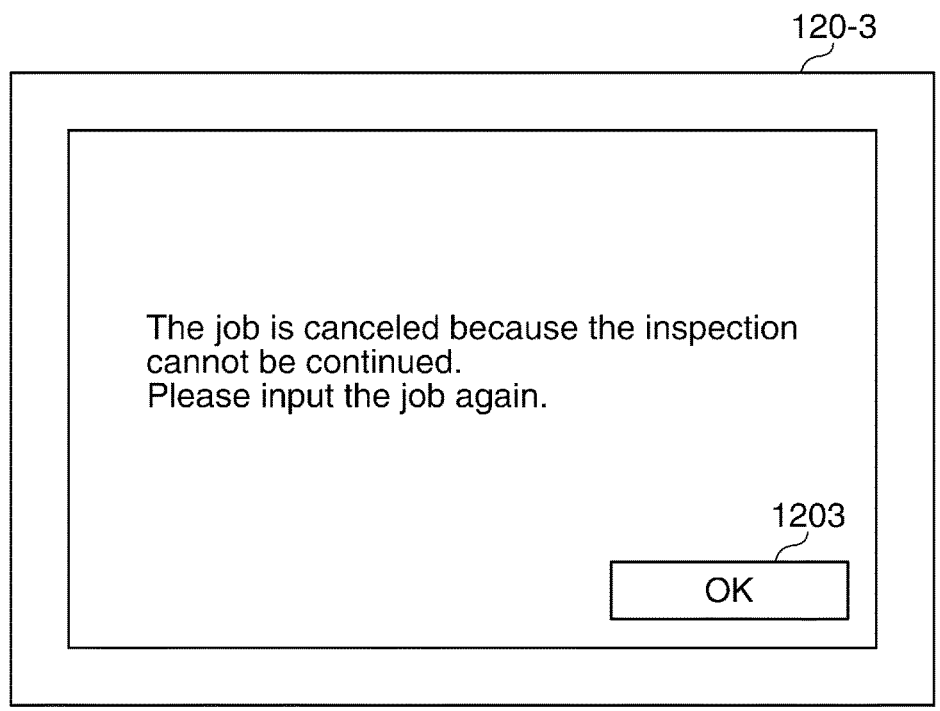
FIG. 12B is a diagram showing a job cancel screen.

FIGS. 12A and 12B are diagrams showing the second print resumption confirmation screen and a job cancel screen, respectively. FIG. 12A shows the second print resumption confirmation screen, denoted by reference numeral 120-2, which displays a message "Please check the page from which inspection is to be started. Will you resume printing?", and a print resumption key 1201 and a job cancel key 1202.

At this time, after confirming a page from which sheet inspection is to be resumed or making a new setting of the page (hereafter referred to as "the sheet inspection resumption page"), for the sheet inspection device 150, using the host computer 101, the user can resume printing by touching the print resumption key 1201 while avoiding generation of a defective sheet caused by sheet duplication inspection. Further, at this time, the user specifies the page P3 to the sheet inspection device 150 as the sheet inspection resumption page. By displaying the second print resumption confirmation screen 120-2, the user can set the sheet inspection resumption page for the sheet inspection device 150 from the host computer 101. This makes it possible to prevent a defective sheet from being generated by sheet duplication inspection, described above with reference to FIGS. 11A to 11D.

On the other hand, if printing is not to be continued, the user presses the job cancel key 1202 on the second print resumption confirmation screen shown in FIG. 12A. This causes the job to be canceled.

Referring again to FIG. 9, if it is determined in the step S116 that the printing apparatus 100 is not configured to display the second print resumption confirmation screen (NO to the step S116), the CPU 114 proceeds to a step S118. In this step, the CPU 114 internally cancels the job, and displays the job cancel screen, shown in FIG. 12B, on the console panel 120 (step S118), followed by terminating the present process.

FIG. 12B shows the job cancel screen, denoted by reference numeral 120-3. The job cancel screen 120-3 is used in a case where the sheet inspection device 150 is not configured to allow the user to set the sheet inspection resumption page, or in a case where the sheet inspection resumption page cannot be set for some reason. In the case where the sheet inspection device 150 is not configured to allow the user to set the sheet inspection resumption page, a defective sheet is detected by sheet duplication inspection, and hence the job cannot be continued. Therefore, in this case, the job cancel screen 120-3 shown in FIG. 12B is provided so as to cancel the job.

The job cancel screen 120-3 displays a message "The job is canceled because the inspection cannot be continued. Please input the job again." and an OK key 1203. The user cancels the job by touching the OK key 1203 on the job cancel screen 120-3.

The job cancel screen 120-3 is displayed to notify the user that the job has been automatically canceled. Therefore, the operation which can be performed by the user is only an operation for closing the screen by touching the OK key 1203.

Although in the present embodiment, after the job is automatically canceled in the step S118, the job cancel screen 120-3 shown in FIG. 12B is displayed for confirmation, the job may be canceled after pressing the OK key 1203.

Referring again to FIG. 9, if it is determined in the step S112 that the printing apparatus 100 is not configured to execute sheet inspection (NO to the step S112), the CPU 114 proceeds to a step S115. Further, if it is determined in the step S113 that the leading jammed sheet is not on the downstream side of the sheet inspection device 150 (NO to the step S113), the CPU 114 proceeds to the step S115. In the step S115, the CPU 114 prompts the user to manually remove the jammed sheet. Then, since it is unnecessary to set the sheet inspection resumption page for the sheet inspection device 150, the CPU 114 automatically resumes printing from the leading page from which printing is to be resumed, set in the step S111 (step S119), followed by terminating the present process.

According to the jam recovery process in FIG. 9, jammed sheets are handled differently depending on whether a leading jammed sheet is on the downstream side or the upstream side of the sheet inspection device 150. Therefore, it becomes easy for the user to determine whether or not it is required to make a setting of the sheet inspection device 150. That is, only in a case where a leading jammed sheet is on the downstream side of the sheet inspection device 150, and the user is required to make a setting of the sheet inspection device 150, the first print resumption confirmation screen 120-1, shown in FIG. 8, or the second print resumption confirmation screen 120-2, shown in FIG. 12A is displayed on the console panel 120. Therefore, it is easy for the user to determine whether or not it is required to make a setting of the sheet inspection device 150, which makes it possible to improve the jam processing efficiency. Here, the case where the user is required to make a setting of the sheet inspection device 150 is a case where unless a page of an image, from which sheet inspection is to be resumed, is set, there is a possibility that a normal sheet is determined as a defective sheet by sheet duplication inspection.

According to the present embodiment, also in the sheet inspection and discharge process performed in the step S104 in FIG. 3, when the user is required to make a setting of the sheet inspection device 150, the first print resumption confirmation screen 120-1 is displayed on the console panel 120 (step S610). This also makes it easy to determine whether or not it is required to make a setting of the sheet inspection device 150, and makes it possible to improve the jam processing efficiency.

Although in the present embodiment, the sheet inspection and discharge process in FIG. 4 has been described as part of the print stopping process performed in accordance with occurrence of a jam, the sheet inspection and discharge process is similarly applied when sheet inspection is executed with respect to sheets conveyed along the sheet conveying paths of the printing apparatus 100 independently of the jam processing. In this case, it is preferable to insert the sheet feeding stopping step (step S606) for stopping feeding of a new sheet between the steps S605 and S607 in FIG. 4.

Next, a description will be given of a second embodiment.

In the first embodiment, the description is given of the method of resuming printing, when a defective sheet is detected and when a jam occurs, respectively. However, detection of a defective sheet and a sheet jam sometimes occur at the same time, depending on the timing. If detection of a defective sheet and a sheet jam occur at the same time, although it is possible to resume a print job by separately processing the sheet jam and the defective sheet using different screens, it is more efficient to collectively process the sheet jam and the defective sheet so as to reduce user's troublesome operation.

To this end, in the second embodiment, in a case where detection of a defective sheet and a sheet jam occur at the same time, the jam and the defective sheet can be collectively processed.

Detection of a defective sheet by the sheet inspection device 150 and a sheet jam asynchronously occur. Therefore, there are a case where only one of detection of a defective sheet and a sheet jam sometimes occurs, and a case where both of them occur at the same time. In a case where detection of a defective sheet and a sheet jam occur at the same time, a page from which printing is to be started at the time of resuming printing is different depending on whether the leading jammed sheet is on the upstream or downstream side of the inspection completion boundary 801.

Figure 13A:
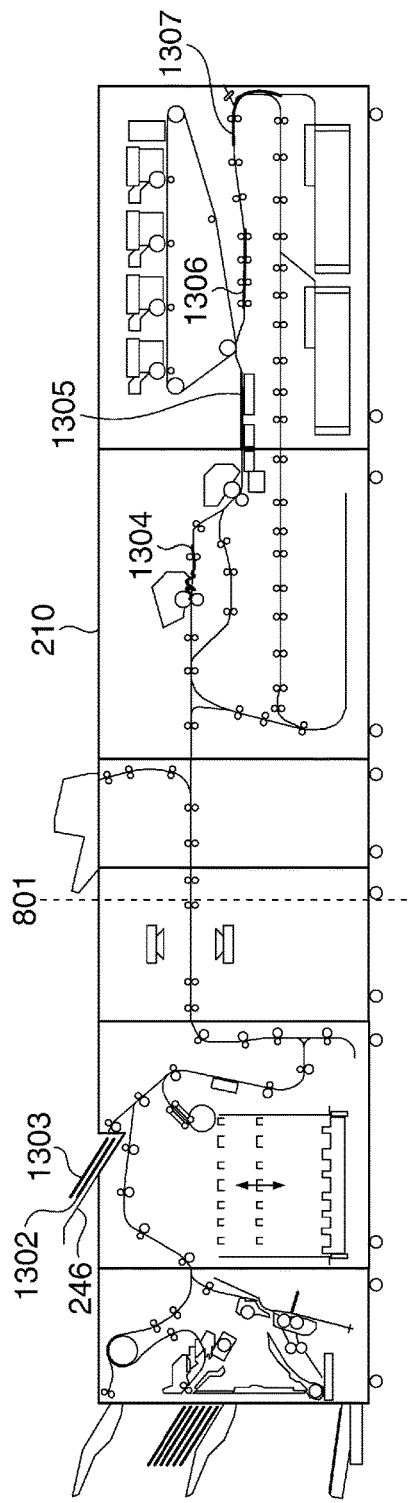
FIG. 13A is a diagram showing a state of the printing apparatus in a case where detection of a defective sheet and a sheet jam occur at the same time when the leading jammed sheet is on the upstream side of the inspection completion boundary.
Figure 13B:
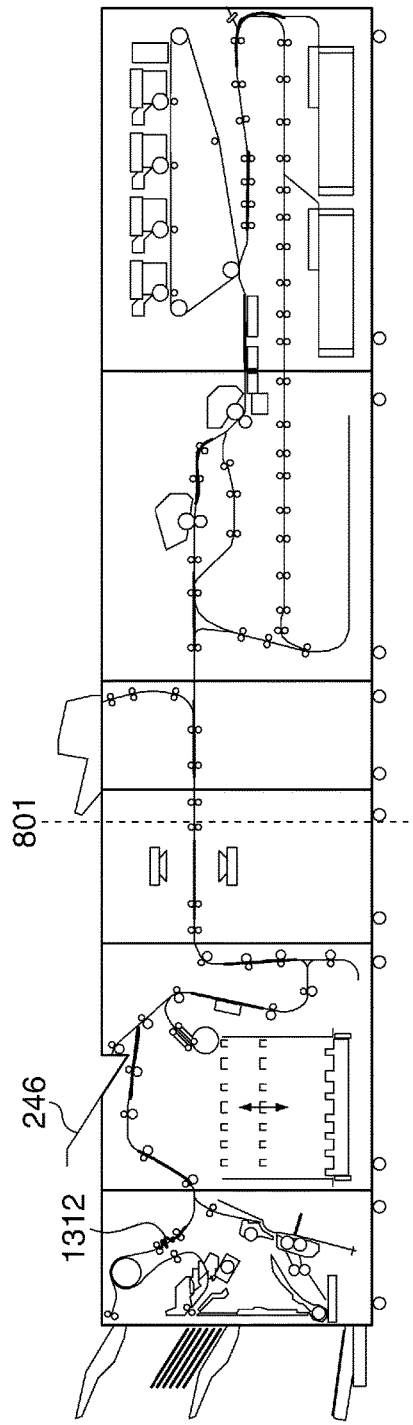
FIG. 13B is a diagram showing a state of the printing apparatus in a case where detection of a defective sheet and a sheet jam occur at the same time when the leading jammed sheet is on the downstream side of the inspection completion boundary.

FIGS. 13A and 13B are diagrams each showing a state of the printing apparatus 100 in a case where detection of a defective sheet and a sheet jam occur at the same time. FIG. 13A shows a case where the leading jammed sheet (sheet 1304) is on the upstream side of the inspection completion boundary 801, and FIG. 13B shows a case where the leading jammed sheet (sheet 1312) is on the downstream side of the inspection completion boundary 801.

As shown in FIG. 13A, the case where the leading jammed sheet is on the upstream side of the inspection completion boundary 801 and also detection of a defective sheet and a sheet jam occur at the same time includes the following cases:

(1) A case where jam of the sheet 1304 occurs within the image fixing unit 210, when sheets 1303 to 1307 following a sheet 1302 are being discharged onto the escape tray 246 after the sheet 1302 is determined as a defective sheet by the sheet inspection device 150, and then the printing apparatus 100 is stopped. (2) A case where jam of the sheet 1304 occurs, and the sheets on the downstream side of the sheet 1304 are inspected by the sheet inspection device 150 as valid sheets. As a result of the inspection, the sheets 1302 and 1303 are determined as defective sheets, and are discharged onto the escape tray 256, and then the printing apparatus 100 is stopped.

In both of the cases (1) and (2), it is necessary to resume printing after jam processing, not from a page (image) printed on the sheet 1304 which is the leading jammed sheet, but from a page (image) printed on the defective sheet 1302.

On the other hand, as shown in FIG. 13B, in a case where the leading jammed sheet is on the downstream side of the inspection completion boundary 801, and detection of a defective sheet and a sheet jam occur at the same time include, similar to FIG. 13A, a case where the defective sheet is detected before occurrence of the sheet jam, and a case where the sheet jam occurs before detection of the defective jam.

However, if jam of the sheet 1312 occurs, sheet conveyance is immediately stopped, and hence even when a defective sheet has been detected from subsequent sheets, the defective sheet is rarely discharged onto the escape tray 246, as shown in FIG. 13B. Of course, to reduce the number of jammed sheets which should be manually removed to the minimum, the configuration may be such that the defective sheet and subsequent sheets are discharged onto the escape tray 246.

In a case where the leading jammed sheet is on the downstream side of the inspection completion boundary 801, it is necessary to resume printing after jam processing, from a page (image) printed on the jammed sheet 1312.

The following description will be given of the jam recovery process performed when detection of a defective sheet and a sheet jam occur at the same time.

Figure 14:
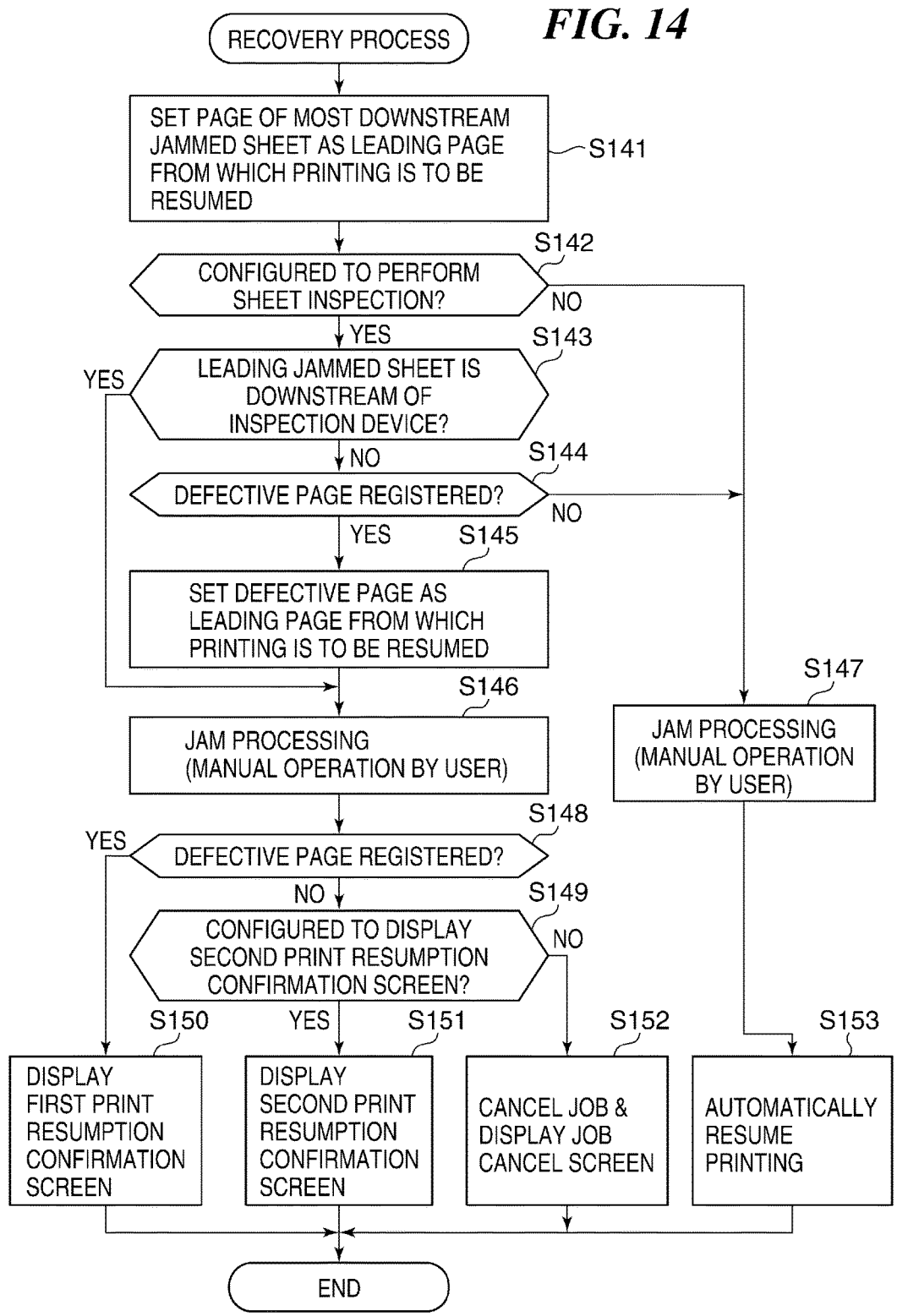
FIG. 14 is a flowchart of a recovery process performed when detection of a defective sheet and a sheet jam occur at the same time.

FIG. 14 is a flowchart of the recovery process performed when detection of a defective sheet and a sheet jam occur at the same time. This recovery process is performed by the CPU 114 of the controller 110 of the printing apparatus 100, according to a jam recovery process program stored in the HDD 115 and loaded into the RAM 113 for execution. This jam recovery process is also started after the print stopping process in FIG. 3 is terminated, similar to the jam recovery process in FIG. 9.

Referring to FIG. 14, when the recovery process is started, the CPU 114 sets a page printed on a leading jammed sheet which is a most downstream jammed sheet as an internal parameter of the leading page from which printing is to be resumed after jam processing (step S141). This page is a page of the leading jammed sheet set in the step S102 or S107 in FIG. 3. Then, the CPU 114 determines whether or not the printing apparatus 100 is configured to execute sheet inspection (step S142).

If it is determined in the step S142 that the printing apparatus 100 is configured to execute sheet inspection (YES to the step S142), the CPU 114 proceeds to a step S143. In this step, the CPU 114 determines whether or not the leading jammed sheet is on the downstream side of the inspection completion boundary 801 (the sheet inspection device 150) (step S143).

If it is determined in the step S143 that the leading jammed sheet is not on the downstream side of the inspection completion boundary 801 (the sheet inspection device 150) (NO to the step S143), the CPU 114 proceeds to a step S144, wherein the CPU 114 determines whether or not there is any defective page detected by sheet inspection and registered in the step S605 in FIG. 4 as an internal parameter (step S144).

If it is determined in the step S144 that there is a defective page registered as an internal parameter (YES to the step S144), the CPU 114 proceeds to a step S145, wherein, since the defective sheet precedes the leading jammed sheet in this case, the CPU 114 sets the page of the defective sheet as the leading page from which printing is to be resumed (step S145). This is because as the sheet from which printing is to be resumed, it is necessary to select the most downstream one of the jammed sheets and the detective sheet detected by sheet inspection.

Then, the CPU 114 prompts the user to manually remove the jammed sheets (step S146). Then, the CPU 114 determines whether or not there is any defective page registered as an internal parameter (step S148). If it is determined in the step S148 that there is a defective page registered in the internal parameter (YES to the step S148), the CPU 114 displays the first print resumption confirmation screen 120-1, shown in FIG. 8, on the console panel 120 (step S150).

At this time, printing is resumed from the defective sheet, based on an operation on the first print resumption confirmation screen 120-1. That is, the user confirms or makes a new setting of the page from which sheet inspection is to be resumed, for the sheet inspection device 150, using the host computer 101, and then touches the print resumption key 701. This makes it possible to resume printing while avoiding detection of a defective sheet generated by sheet duplication inspection. Then, the CPU 114 terminates the present process.

On the other hand, if it is determined in the step S148 that there is no defective page registered as an internal parameter (NO to the step S148), the CPU 114 proceeds to a step S149, wherein the CPU 114 determines whether or not the printing apparatus 100 is configured to display the second print resumption confirmation screen 120-2, shown in FIG. 12A, on the console panel 120 in a case where the leading jammed sheet is on the downstream side of the inspection completion boundary 801 (step S149). Note that a user may be enabled to make a setting of whether or not to display the second print resumption confirmation screen 120-2 on the console panel 120, through operating the console panel 120, and store the setting in the nonvolatile memory 112 of the controller 110. Further, the user may be enabled to set this setting in the print job by using the host computer 101.

If it is determined in the step S149 that the printing apparatus 100 is configured to display the second print resumption confirmation screen 120-2 (YES to the step S149), the CPU 114 displays the second print resumption confirmation screen, shown in FIG. 12A, on the console panel 120 (step S151). At this time, printing after jam recovery processing is resumed by a user's operation. That is, the user confirms or makes a new setting of the page from which sheet inspection is to be resumed for the sheet inspection device 150 using the host computer 101, and then presses the print resumption key 1201. This makes it possible to resume printing while avoiding detection of a defective sheet by sheet duplication inspection.

Further, if it is determined in the step S149 that the printing apparatus 100 is not configured to display the second print resumption confirmation screen 120-2 (NO to the step S149), the CPU 114 proceeds to a step S152. In this step, the CPU 114 internally cancels the job, and displays the job cancel screen, shown in FIG. 12B, on the console panel 120 (step S152). The user can cancel the job by touching the OK key 1203 on the job cancel screen 120-3.

The job cancel screen, shown in FIG. 12B, is displayed in a case where the sheet inspection device 150 is not configured to set the sheet inspection resumption page, or the sheet inspection resumption page cannot be set for some reason. Unless the sheet inspection resumption page can be set for the sheet inspection device 150, a defective sheet is detected by sheet duplication inspection, and hence the job cannot be continued. To avoid this inconvenience, the job cancel screen shown in FIG. 12B is provided.

On the other hand, if it is determined in the step S142 that the printing apparatus 100 is not configured to execute sheet inspection (NO to the step S142), the CPU 114 proceeds to a step S147. Further, if it is determined in the step S144 that the there is no defective page registered as an internal parameter (NO to the step S144), the CPU 114 proceeds to the step S147. In this step, the CPU 114 prompts the user to manually remove the jammed sheet(s) (step S147). Then, since it is unnecessary to set the page from which inspection is to be resumed, for the sheet inspection device 150, the CPU 114 automatically causes printing to be resumed from the leading page from which printing is to be resumed, set in the step S141 (step S153), followed by terminating the present process.

If it is determined in the step S143 that the jammed sheet is on the downstream side of the sheet inspection device 150 (YES to the step S143), the CPU 114 proceeds to the step S146.

According to the process in FIG. 14, if a jam occurs, the first print resumption confirmation screen 120-1, shown in FIG. 8, or the second print resumption confirmation screen 120-2, shown in FIG. 12A, is displayed on the console panel 120 only when the user is required to make a setting of the sheet inspection device 150. This enables the user to confirm the page from which inspection is to be resumed only when required, and eliminates a troublesome operation for always confirming a page from which printing is to be resumed and a page from which inspection is to be resumed.

In the present embodiment, the first print resumption confirmation screen displayed in the step S150 and the second print resumption confirmation screen displayed in the step S151 are different from each other in that the page from which printing is to be resumed is a page printed on a defective sheet or a page printed on a leading jammed sheet, but are the same as the operation for causing printing to be resumed. Therefore, if it is unnecessary to determine whether the page from which printing is to be resumed is a page printed on a defective sheet or a page printed on a leading jammed sheet, a common screen can be used without making the screens to be displayed different from each other.

In the present embodiment, the processing operations performed to cause printing to be resumed is made different depending on whether a leading jammed sheet is on the upstream side or the downstream side of the sheet inspection device 150 (step S143). This makes it possible to properly cause printing to be resumed according to the position where a jammed sheet is produced.

In the first and second embodiments, if a jam occurs, the second print resumption confirmation screen 120-2 shown in FIG. 12A is displayed only when a user is required to make a setting of the sheet inspection device 150, and printing is automatically resumed in a case where the jam occurs on the upstream side of the inspection completion boundary 801. The case where a user is required to make a setting of the sheet inspection device 150 is a case where a jam occurs on the downstream side of the inspection completion boundary 801. However, to resume printing based on a user' instruction, the flow of operations can be configured such that in a case where a jam occurs on the upstream side of the inspection completion boundary 801, printing is not automatically resumed, but a screen, shown in FIG. 15, is displayed which is changed in display message from the screen shown in FIG. 12A.

Figure 15:
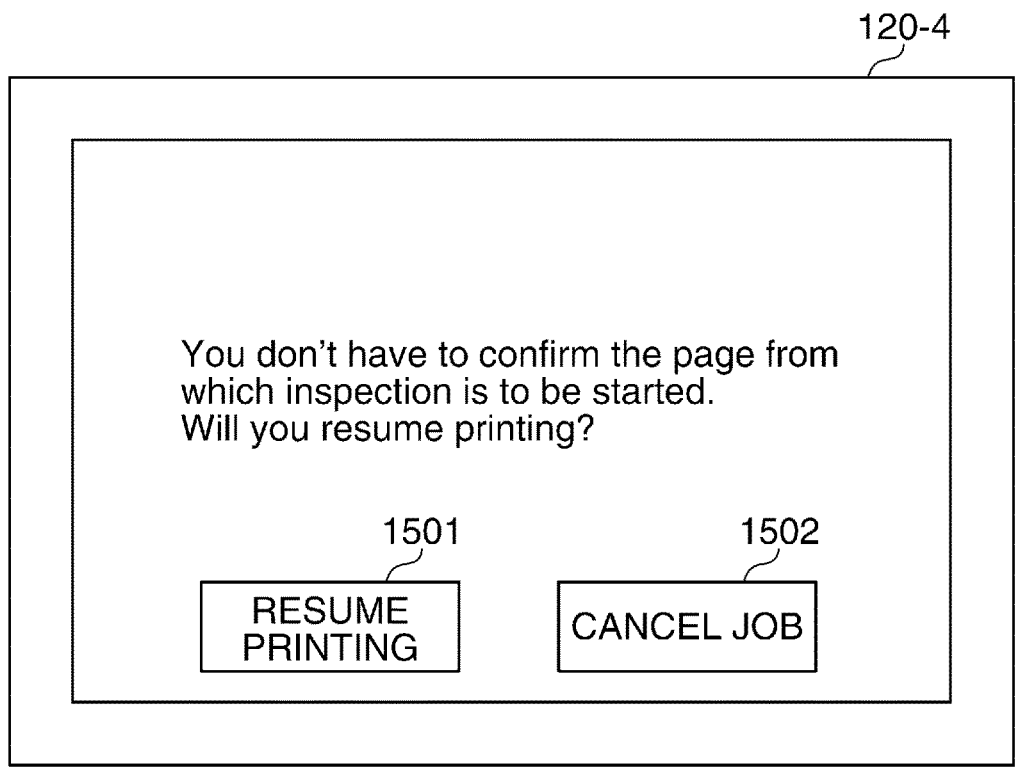
FIG. 15 is a diagram showing a third print resumption confirmation screen displayed when it is unnecessary to check an inspection start page.

FIG. 15 is a diagram showing, as a first variation of the embodiments, a third print resumption confirmation screen displayed when it is unnecessary to confirm a page from which inspection is to be resumed.

Differently from the second print resumption confirmation screen 120-2 shown in FIG. 12A, the third print resumption confirmation screen, denoted by reference numeral 120-4, in FIG. 15 displays a message to the effect that it is unnecessary to confirm the page from which inspection is to be started, to thereby notify a user that printing can be directly resumed. When the user touches a print resumption key 1501 on this screen, printing is resumed, whereas when the user touches a job cancel key 1502, the job is canceled.

In the above-described embodiments, when a jam occurs on the downstream side of the inspection completion boundary 801, it is necessary for a user to confirm images on the removed jammed sheets, or an image on the last sheet output to the discharge tray, in order to set the page from which inspection is to be started, for the sheet inspection device 150. However, the jammed sheets can be broken, or when the jammed sheets are removed, the user may become incapable of knowing the order of them. Further, when confirming discharged sheets, if they are stacked on a large-capacity stacker or the like, the user cannot view them without opening the door, depending on the type of the large-capacity stacker or the like.

In view of this, in a second variation of the embodiments, to reduce time and effort of such a user's operation, and reduce the possibility of a user's error, the second print resumption confirmation screen 120-2 is changed into a fourth second print resumption confirmation screen which makes it possible to preview a page from which printing is to be resumed. Note that the first print resumption confirmation screen 120-1 may be changed so as to make it possible to preview the page from which printing is to be resumed.

Figure 16A:
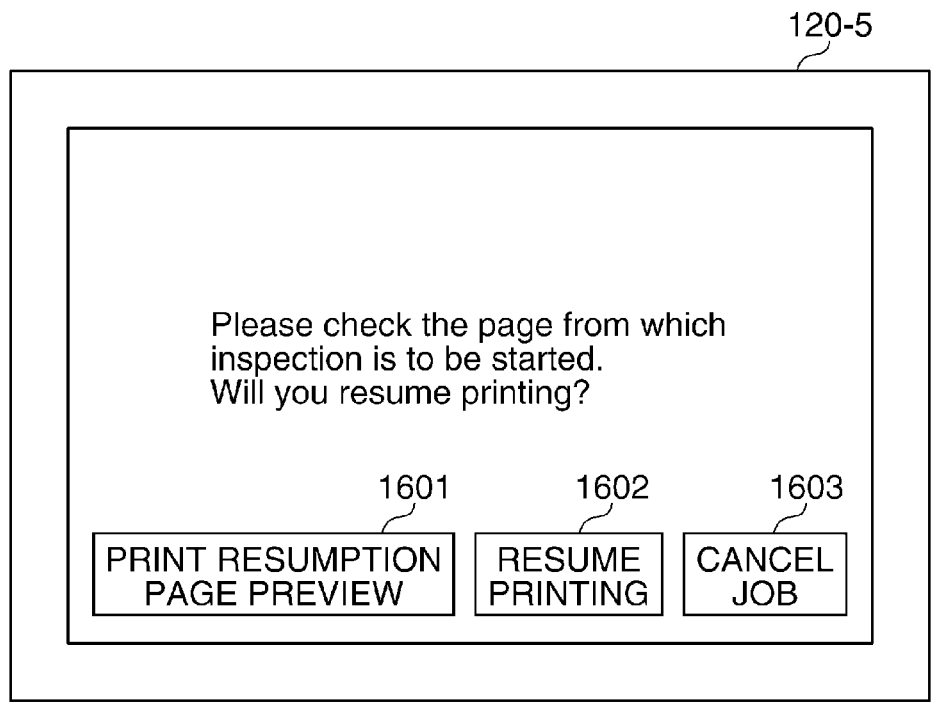
FIG. 16A is a diagram showing a fourth print resumption confirmation screen.
Figure 16B:
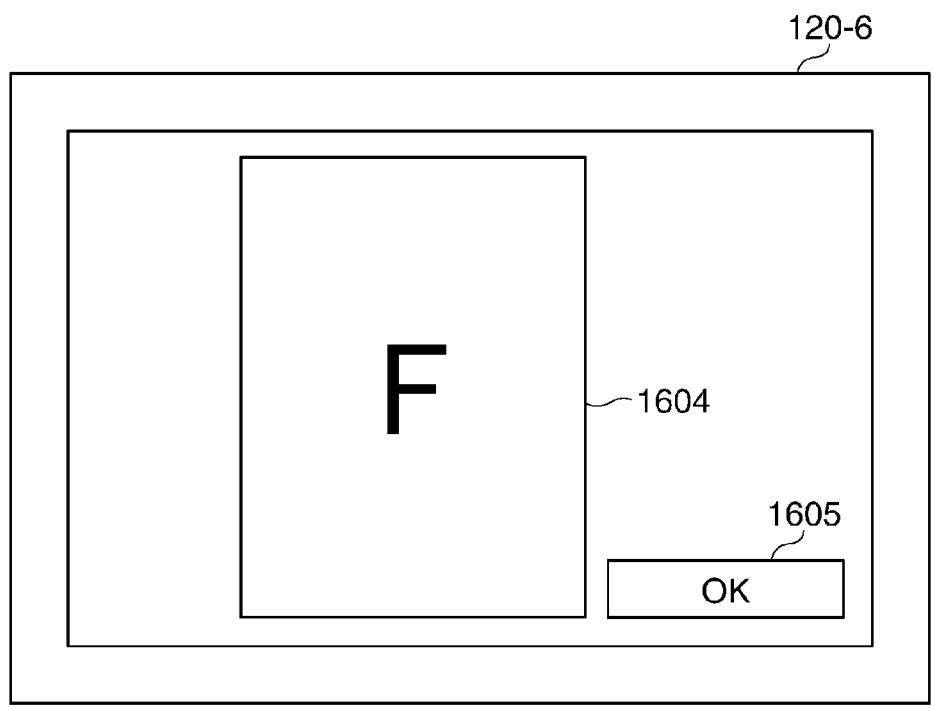
FIG. 16B is a diagram showing a preview screen of a page from which printing is to be resumed.

FIGS. 16A and 16B are diagrams showing the fourth print resumption confirmation screen, denoted by reference numeral 120-5, and a print resumption page preview screen 120-6, respectively. Referring to FIGS. 16A and 16B, the fourth print resumption confirmation screen 120-5 in FIG. 16A is formed by adding a print resumption page preview key 1601 to the second print resumption confirmation screen 120-2 shown in FIG. 12A. When the user touches the print resumption page preview key 1601, the display screen is shifted to the print resumption page preview screen 120-6, in FIG. 16B, which displays a first image to be printed when printing is resumed. Further, when the user touches a print resumption key 1602, printing is resumed, whereas when the user touches a job cancel key 1603, the job is canceled.

FIG. 16B shows the print resumption page screen 120-6. Reference numeral 1604 denotes a preview image of a page from which printing is to be resumed, which is a thumbnail of an image of the leading page from which printing is to be resumed, set in any of the step S111 in FIG. 9, and the steps S141 and S145 in FIG. 14. After confirming the displayed image, the user may set the confirmed image as the page from which inspection is to be resumed, for the sheet inspection device 150, from the host computer 101. When the user touches an OK key 1605 on the print resumption page screen 120-6, the screen is returned to the fourth print resumption confirmation screen 120-5 shown in FIG. 16A.

According to the present variation, an image of the page from which printing is to be resumed is displayed for preview. This enables the user to confirm the page from which printing is to be resumed, and easily determine whether or not the page is a proper one. In the present variation, instead of displaying the image of the page from which printing is to be resumed, for preview, a page number of a page from which printing is to be resumed can be displayed on the console section 120 by providing a number display section, not shown. In the present variation, the preview screen of the page from which printing is to be resumed can be displayed according to a user request. This makes it possible to reduce time and effort of the user's operation when resuming printing, and prevent a user's error.

Further, as a third variation of the embodiments, the printing apparatus 100 may be configured such that in a case where the leading jammed sheet is on the downstream side of a detecting section (cameras 231, 232) of the sheet inspection device 150, it is possible to make a setting of the sheet inspection device 150 such that sheet duplication inspection for detecting duplication of a plurality of sheets having the same image formed thereon is excluded from the inspection items with respect to designated pages. This makes it possible to perform sheet inspection on reprinted sheets on which are printed the same images as those printed on jammed sheets including one that has caused the jam after being subjected to sheet inspection, and thereby determine whether or not each image is normal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-165738 filed Aug. 26, 2016, which is hereby incorporated by reference herein in its entirety.

What is claimed is:

1. An image forming apparatus comprising:
an image forming unit configured to form an image on a sheet;
a conveying path for conveying a sheet supplied from the image forming unit;
a sheet inspection device configured to perform a sheet duplication inspection on a sheet being conveyed through the conveying path;
a display unit configured to display information; and
a controller configured to control the image forming unit to:
to interrupt image formation when a jam occurs in the conveying path; and
resume formation of images including respective images formed on one or more jammed sheets, after the one or more jammed sheets are removed,
wherein, in a case where one of the one or more jammed sheets is on a downstream side of the sheet inspection device, the controller is configured to control the image forming unit to resume the image formation from an image formed on the one of the one or more jammed sheets, based on a user instruction for resuming the image formation, and
wherein, in a case where one of the one or more jammed sheets is on an upstream side of the sheet inspection device, the controller is configured to control the image forming unit to resume the image formation from an image formed on the one of the one or more jammed sheets, without the user instruction for resuming the image formation.

2. The image forming apparatus according to claim 1, wherein the controller is configured to control the display unit to display a screen for confirming a page from which inspection by the sheet inspection device is to be resumed.

3. The image forming apparatus according to claim 1, wherein the controller is configured to set a sheet from which the inspection by the sheet inspection device is to be resumed, and
wherein, in a case where a sheet on which the image formed on the one of the jammed sheets is to be formed is set as the sheet from which the inspection is to be resumed, and the user instruction for resuming the image formation is given, the controller is configured to control the image formation unit to resume the image formation.

4. The image forming apparatus according to claim 1, wherein the controller is configured to control the display unit to display a first image to be formed when the image formation is resumed, before the user instruction for resuming the image formation is given to resume the image formation.

5. The image forming apparatus according to claim 4, wherein the controller is configured to control the display unit to display the first image according to a user request.

6. The image forming apparatus according to claim 1, wherein the controller is configured to control the display unit to display a number of a first image to be formed when the image formation is resumed, before the user instruction for resuming the image formation is given to resume the image formation.

7. The image forming apparatus according to claim 6, wherein the controller is configured to control the display unit to display the number of the image according to a user request.

8. The image forming apparatus according to claim 1, wherein the sheet inspection device includes a camera configured to photograph an image formed on the sheet, and perform the inspection on an image formed on the sheet using the photographed image.

9. The image forming apparatus according to claim 1, wherein when the user instruction for resuming the image formation has not been given, the controller is configured to cancel an image formation job.

10. The image forming apparatus according to claim 1, wherein determination of whether any jammed sheet is on the downstream side of the sheet inspection device is performed with reference to an inspection completion boundary in the sheet inspection device.

11. An image forming apparatus comprising:
a image forming unit configured to form an image on a sheet;
a conveying path for conveying a sheet supplied from the image forming unit;
a sheet inspection device provided configured to inspect the image on a sheet being conveyed through the conveying path;
a display unit configured to display information; and
a controller configured to control the image formation unit to resume formation of images including respective images formed on one or more jammed sheets, in a case where a jam occurs in the conveying path,
wherein, in a case where one of the one or more jammed sheets is on a downstream side of the sheet inspection device, the controller is configured to control the sheet inspection device to exclude sheet duplication inspection for detecting duplication of a plurality of sheets on which the same image is formed, from items of inspection.

12. The image forming apparatus according to claim 11, wherein determination of whether or not any jammed sheet is on the downstream side of the sheet inspection device is performed with reference to an inspection completion boundary in the sheet inspection device.

* * * * *